US008723976B2

(12) United States Patent
Imamura

(10) Patent No.: US 8,723,976 B2
(45) Date of Patent: May 13, 2014

(54) IMAGING DEVICE AND STORAGE MEDIUM

(75) Inventor: Keiichi Imamura, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 874 days.

(21) Appl. No.: 12/341,376

(22) Filed: Dec. 22, 2008

(65) Prior Publication Data

US 2009/0167877 A1 Jul. 2, 2009

(30) Foreign Application Priority Data

Dec. 28, 2007 (JP) .................................. 2007-340055
Feb. 1, 2008 (JP) .................................. 2008-023354
Dec. 11, 2008 (JP) .................................. 2008-315463

(51) Int. Cl.
*H04N 5/235* (2006.01)
*H04N 5/228* (2006.01)
*H04N 5/238* (2006.01)

(52) U.S. Cl.
USPC .......................... 348/222.1; 348/363; 348/367

(58) Field of Classification Search
USPC ......................................... 348/229.1, 362–368
See application file for complete search history.

(56) References Cited

U.S. PATENT DOCUMENTS

| | | | |
|---|---|---|---|
| 7,676,150 B2 | 3/2010 | Nakashima | |
| 8,045,013 B2 | 10/2011 | Abe | |
| 8,089,523 B2* | 1/2012 | Miyata | 348/222.1 |
| 2005/0219374 A1* | 10/2005 | Uenaka | 348/208.12 |
| 2006/0165396 A1* | 7/2006 | Yamazaki | 396/55 |
| 2007/0052832 A1* | 3/2007 | Bae et al. | 348/333.12 |
| 2007/0195174 A1* | 8/2007 | Oren | 348/222.1 |
| 2007/0242138 A1* | 10/2007 | Manico et al. | 348/231.3 |
| 2007/0242937 A1* | 10/2007 | Sano et al. | 396/55 |
| 2008/0186386 A1* | 8/2008 | Okada et al. | 348/208.4 |
| 2008/0187185 A1* | 8/2008 | Misawa et al. | 382/118 |
| 2009/0128640 A1* | 5/2009 | Yumiki | 348/208.6 |

FOREIGN PATENT DOCUMENTS

| | | |
|---|---|---|
| JP | 11-187350 A | 7/1999 |
| JP | 2001-051338 A | 2/2001 |
| JP | 2005-056387 A | 3/2005 |
| JP | 2006-174105 A | 6/2006 |
| JP | 2006-180471 A | 7/2006 |
| JP | 2007-020105 A | 1/2007 |
| JP | 2007-067560 A | 3/2007 |
| JP | 2006-067452 A | 3/2008 |
| JP | 2008-299430 A | 12/2008 |
| JP | 2008-311819 A | 12/2008 |

OTHER PUBLICATIONS

Japanese Office Action dated Jan. 20, 2012 (and English translation thereof) in counterpart Japanese Application No. 2008-315463.
Japanese Office Action dated Oct. 16, 2013 (and English translation thereof) in counterpart Japanese Application No. 2012-061966.
Japanese Office Action dated Jun. 11, 2013 (and English translation thereof) in counterpart Japanese Application No. 2012-061966.

* cited by examiner

*Primary Examiner* — Sinh Tran
*Assistant Examiner* — Christopher K Peterson
(74) *Attorney, Agent, or Firm* — Holtz, Holtz, Goodman & Chick, PC

(57) ABSTRACT

A digital camera comprises a CCD, a flash memory for storing images captured by the CCD, setting unit configured to set a recording condition, an auto shutter condition table for storing auto recording conditions for each of the auto shutter mode which are set by detecting an input from a key input device during auto shutter mode setting, and a CPU for determining whether the captured image satisfies the set recording condition and for recording the captured image to the flash memory it is determined that the image satisfies the recording condition.

17 Claims, 17 Drawing Sheets

| AUTO SHUTTER MODE | LEVEL SETTING FLAG | SENSITIVITY LEVEL | THRESHOLD | | |
|---|---|---|---|---|---|
| | | | S1 | S2 | S3 |
| ANTI BLUR AUTO SHUTTER MODE | 0 | Lv. 0 | 0 | 0 | 0 |
| | 1 | Lv. 1 | 1 | 0 | 0 |
| | 0 | Lv. 2 | 0 | 1 | 0 |
| | 0 | Lv. 3 | 0 | 0 | 1 |
| PAN AUTO SHUTTER MODE | 0 | Lv. 0 | 0 | 0 | 0 |
| | 0 | Lv. 1 | 1 | 0 | 0 |
| | 0 | Lv. 2 | 0 | 1 | 0 |
| | 1 | Lv. 3 | 0 | 0 | 1 |
| SMILE DETECTION AUTO SHUTTER | 0 | Lv. 0 | 0 | 0 | 0 |
| | 0 | Lv. 1 | 1 | 0 | 0 |
| | 1 | Lv. 2 | 0 | 1 | 0 |
| | 0 | Lv. 3 | 0 | 0 | 1 |

FIG.2A

| THRESHOLD | | |
|---|---|---|
| S1 | S2 | S3 |
| 6000 | 1000 | 400 |

FIG.2B

IMAGING DEVICE AND STORAGE MEDIUM

CROSS-REFERENCE TO RELATED APPLICATIONS

This application is based upon and claims the benefit of priority from prior Japanese Patent Applications No. 2007-340055, filed Dec. 28, 2007; No. 2008-023354, filed Feb. 1, 2008; and No. 2008-315463, filed Dec. 11, 2008 the entire contents of all of which are incorporated herein by reference.

BACKGROUND OF THE INVENTION

1. Field of the Invention

The present invention relates to an imaging device having an automatic recording function and a storage medium in which a program executed by the imaging device is stored.

2. Description of the Related Art

Conventionally, there is devised a digital camera provided with a function (hereinafter referred to as an automatic recording function) of recording an image automatically photographed without detecting a shutter instruction based on a user operation.

For example, in a digital camera which automatically detects a human face to take a photograph, when a smile appears on the face, the digital camera detects this change to automatically perform the recording.

Thus, in the conventional imaging device having such automatic recording function, the particular change is detected, and a determination as to whether or not the recording can be performed is made based on whether or not a degree of the particular change matches a set condition.

BRIEF SUMMARY OF THE INVENTION

The present invention is directed to an imaging device which can perform automatic recording under the condition desired by a user and a storage medium in which a program executed by the imaging device is stored.

According to an embodiment of the present invention, an imaging device comprises an imaging unit configured to sequentially capture images; an image recording unit configured to record an image captured by the imaging unit; a setting unit configured to set a recording condition of the image recording unit; a determination unit configured to determine whether or not the image captured by the imaging unit satisfies the recording condition set by the setting unit; and a recording control unit configured to control the image recording unit to record the image when the determination unit determines that the image satisfies the recording condition.

According to another embodiment of the present invention, a computer readable storage medium having a computer program stored thereon that is executed by a computer of an image capture apparatus to control the image capture apparatus to perform functions comprises setting a recording condition; determining whether or not the captured image satisfies the set recording condition; and recording the captured image when it is determined that the captured image satisfies the recording condition.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2A shows contents of an auto shutter condition table 121;

FIG. 2B shows contents of a threshold table 122;

DETAILED DESCRIPTION OF THE INVENTION

An embodiment of an imaging apparatus according to the present invention will now be described with reference to the accompanying drawings. A digital camera is described as the imaging apparatus.

First Embodiment

A. Configuration of Digital Camera

Figure 1:
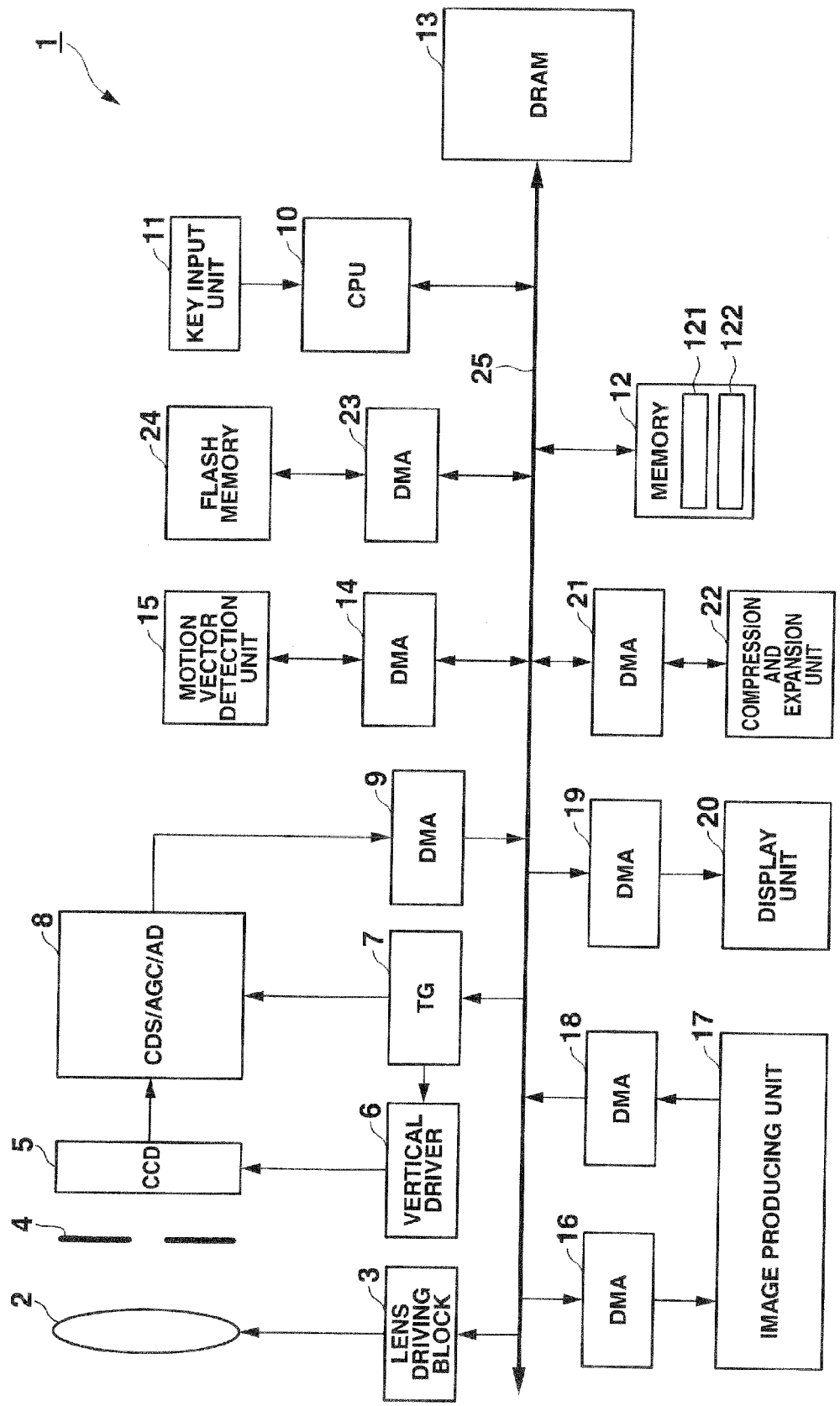
FIG. 1 is a block diagram showing a digital camera according to a first embodiment of the invention.

FIG. 1 is a block diagram schematically showing an electric configuration of a digital camera 1 according to the first embodiment of the invention.

The digital camera 1 comprises an imaging lens 2, a lens driving block 3, a diaphragm shutter 4, a CCD 5, a vertical driver 6, a TG (timing generator) 7, a unit circuit 8, a Direct Memory Access controller (hereinafter referred to as DMA) 9, a CPU 10, a key input unit 11, a memory 12, a DRAM 13, a DMA 14, a motion vector detection unit 15, DMA 16, an image producing unit 17, a DMA 18, a DMA 19, a display unit 20, a DMA 21, a compression and expansion unit 22, a DMA 23, a flash memory 24, and a bus 25.

The imaging lens 2 includes a focus lens and a zoom lens which are formed by plural lens groups (not shown). The lens driving block 3 is connected to the imaging lens 2. The lens driving block 3 includes a focus motor (not shown), a zoom motor (not shown), a focus motor driver (not shown), and a zoom motor driver (not shown). The focus motor and the zoom motor drive a focus lens and a zoom lens in an optical axis direction, respectively. The focus motor driver and the zoom motor driver drive the focus lens and the zoom lens in the optical axis direction in response to a control signal transmitted from the CPU 10.

The diaphragm 4 includes a drive circuit (not shown), and the drive circuit operates the diaphragm 4 in response to the control signal transmitted from the CPU 10.

The diaphragm 4 shall mean a mechanism which controls a quantity of light incident to the CCD 5.

An exposure amount is defined by a diaphragm value and a shutter speed.

The vertical driver 6 scans and drives the CCD 5, the CCD 5 performs photoelectric conversion of light intensity for each color of an RGB value of a subject image into an imaging signal at a constant period, and the CCD 5 supplies the imaging signal to the unit circuit 8. The CPU 10 controls the operation timing of the vertical driver 6 and unit circuit 8 through the TG 7. The CCD 5 includes a Bayer type color filter, and also has a function as an electronic shutter. The CPU 10 controls the shutter speed of the electronic shutter through the vertical driver 6 and the TG 7.

The TG 7 is connected to the unit circuit 8, and the unit circuit 8 includes a Correlated Double Sampling (CDS) circuit, an Automatic Gain Control (AGC) circuit, and an A/D converter. The CDS circuit performs correlated double sampling on an imaging signal supplied from the CCD 5, and holds the imaging signal. The AGC circuit performs an automatic gain control of the imaging signal after the correlated double sampling. The A/D converter converts the analog signal after the automatic gain control into a digital signal. After passing through the unit circuit 8, the imaging signal obtained by the CCD 5 is stored in the buffer memory (DRAM 13) as the Bayer data.

The CPU 10 has a function of performing AE processing, AF processing, and imaging processing. The CPU 10 is a one-chip microcomputer which controls each unit of the digital camera 1, and also includes a clock circuit which measures the clock time.

The CPU 10 has a function of causing the CCD 5 to periodically photograph an image to obtain image data, a function of setting a sensitivity level of each auto shutter mode, a function of determining whether or not an auto shutter condition corresponding to the sensitivity level set based on the periodically photographed image data is satisfied, a function of performing automatic recording processing in the case where the auto shutter condition is satisfied, a function of detecting a human face existing in the image data, and a function of performing smile detection processing for detecting a smile on the detected face.

The key input unit 11 includes plural operation keys such as a shutter button in which halfway press and full press can be performed, a mode switching key which switches a photographing mode and a reproduction mode, a menu key, an arrow key, a SET key, a cancel key, an auto shutter mode key, an auto shutter mode release key, and a zoom key ("W" key and "T" key). The key input unit 11 supplies an operation signal to the CPU 10 in response to a key operation of a user.

The memory 12 is a storage medium in which a control program with which the CPU 10 controls each unit of the digital camera 1 and necessary data are recorded. The CPU 10 is operated by loading the program recorded in the storage medium.

An auto shutter condition table 121 and a threshold table 122 are stored in the memory 12.

FIG. 2A shows contents of the auto shutter condition table 121.

In the first embodiment, there are three kinds of auto shutter modes, that is, an anti blur auto shutter mode, a pan auto shutter mode, and a smile detection auto shutter mode.

The anti blur auto shutter is a function of automatically recording the photographed image at that time when a camera direction is not changed, namely, when blurring is not detected in the photographed images which are sequentially photographed by the CCD 5 and displayed as a live view.

The pan auto shutter is a function of automatically recording the photographed image when a change in position of a main subject image is not detected. The main subject image is commonly included in the photographed images which are sequentially photographed by the CCD 5 and displayed as the live view.

The smile detection auto shutter is a function of automatically recording the photographed image at that time by detecting that a facial expression of a person commonly included in the photographed images which are sequentially photographed by the CCD 5 and displayed as the live view becomes a smile better than a predetermined value.

FIG. 2A shows an auto shutter condition table 121. In each of various auto shutter modes (anti blur auto shutter mode, pan auto shutter mode, and smile detection auto shutter mode), the auto shutter condition table 121 includes a region where the sensitivity level is recorded and a region where which threshold is used in plural thresholds S (in this case, three thresholds S1, S2, and S3) according to the sensitivity level is recorded and managed by a flag.

"1" is recorded only in the threshold S1 (flag is set) in the case where the sensitivity level is set at Lv. 1 irrespective of the auto shutter mode, the flag is set in the threshold S2 in the case where the sensitivity level is set at Lv. 2, and the flag is set in the threshold S3 in the case where the sensitivity level is set at Lv. 3.

In the case where the sensitivity level is set at Lv. 0, because the flag is not set in any thresholds (S1 to S3), the recording is not performed with the auto shutter.

With reference to a relationship between the auto shutter and the sensitivity level, the recording is not performed with the auto shutter as the sensitivity level becomes lower, while the recording is easily performed with the auto shutter as the sensitivity level becomes higher.

A region where a level setting flag is recorded in each sensitivity level of various auto shutter modes also exists in the auto shutter condition table. The level setting flag is recorded such that the flag of "1" is set by an operation of the user at the region corresponding to the sensitivity level. That is, the sensitivity level corresponding to the region where "1" is set in the level setting flag is the currently set sensitivity level, and the applied threshold S is also defined. The sensitivity level can be set in each auto shutter mode.

For example, referring to FIG. 2A, in the anti blur auto shutter, because the level setting flag of "1" is set in the region corresponding to Lv. 1, the sensitivity level becomes Lv. 1 and the threshold becomes S1.

In the pan auto shutter, because the level setting flag of "1" is set in the region corresponding to Lv. 3, the sensitivity level becomes Lv. 3 and the threshold becomes S3.

In the smile detection auto shutter, because the level setting flag of "1" is set in the region corresponding to Lv. 2, the sensitivity level becomes Lv. 2 and the threshold becomes S2.

Thus, it is assumed that the level setting flag is recorded according to one of the sensitivity levels in each auto shutter mode.

FIG. 2B shows contents of a threshold table 122.

Values of the thresholds S1, S2, and S3 are recorded in the threshold table 122.

Because the recording is easily performed with the auto shutter as the sensitivity level becomes higher, the value (in this case, 400) of the threshold S3 corresponding to the largest sensitivity level Lv. 3 becomes minimum in the threshold S, and the value of the corresponding threshold S is increased as the sensitivity level becomes lower. In FIG. 2B, the value of the threshold S2 is set at 1000 and the value of the threshold S1 is set at 6000.

The DRAM 13 is used as a buffer memory in which the image data photographed by the CCD 5 is temporarily stored, and the DRAM 13 is also used as a working memory of the CPU 10.

The DMA 14 reads the Bayer data or the luminance color-difference signal image data which is stored in the buffer memory, and supplies the Bayer data or the luminance color-difference signal image data to the motion vector detection unit 15.

The motion vector detection unit 15 detects a moving amount or a moving direction of a motion vector in a certain region of the image data. The moving amount and the moving direction are detected in units of pixels of the motion vector of the image data by a representative matching method or a block matching method.

In the motion vector detection unit 15, the photographed image data is divided into plural pixel regions, and the moving amount and the moving direction of the motion vector of each block are detected based on the image data and the later-photographed image data of each of the pixel regions. Therefore, the motion vector detection unit 15 includes a memory circuit which stores the photographed image data for a predetermined time. The detected moving amount and moving direction of the motion vector are transmitted to the CPU 10 through the DMA 14.

The motion vector detection unit 15 also has a function of specifying the main subject region based on the detected moving amount and moving direction of the motion vector of each pixel region. The specification of the main subject will be described later.

The DMA 16 reads the image data in the form of the Bayer data stored in the buffer memory (DRAM 13), and supplies the image data to the image producing unit 17.

The image producing unit 17 performs pieces of processing such as pixel interpolation processing, gamma correction processing, and white balance processing on the image data supplied from the DMA 16, and generates the luminance color-difference signal (YUV data). That is, the image producing unit 17 is a unit which performs image processing.

The DMA 18 stores the luminance color-difference signal image data (YUV data), on which the image processing is performed by the image producing unit 17, in the buffer memory.

The DMA 19 supplies the image data in the form of the YUV data stored in the buffer memory to the display unit 20.

The display unit 20 includes a color LCD and a drive circuit thereof, and displays the image of the image data supplied from the DMA 19.

The DMA 21 supplies the image data in the form of the YUV data stored in the buffer memory or compressed image data to the compression and expansion unit 22, and stores the image data compressed or the expanded image data by the compression and expansion unit 22 in the buffer memory. The DMA 21 supplies the image data (YUV data) which is photographed through the automatic recording processing and stored in the buffer memory to the compression and expansion unit 22.

The compression and expansion unit 22 compresses and expands the image data (for example, in the JPEG or MPEG format).

The DMA 23 reads the compressed image data stored in the buffer memory to record the image data in the flash memory 24, or stores the compressed image data written into the flash memory 24 in the buffer memory.

B. Relationship Between Various Auto Shutter Modes and Automatic Recording Condition A relationship between various auto shutter modes and an auto shutter condition will be described below.

B-1. Relationship Between Anti Blur Auto Shutter and Automatic Recording Condition The case in which the auto shutter is performed when a calculated blur estimated value dV is not lower than the threshold S3 corresponding to the sensitivity level set in the anti blur auto shutter mode will be described below.

The blur estimated value dV is calculated from the following equation:

$$dV = K1 \times K2 \times (1/dP) \qquad (\text{Eq. 1})$$

A coefficient dP, a coefficient K1, and a coefficient K2 expressed in Eq. 1 will be described.

The coefficient dP indicates a moving amount per unit time of the motion vector detected by the motion vector detection unit 15. The coefficient dP substituted in Eq. 1 is an average value of the moving amount of the motion vector in each pixel region of the image data or the motion vector having the largest moving amount.

The coefficient K1 is determined in relation to the shutter speed in recording a still image.

The shutter speed has an influence on a degree of image blurring of the recorded image. For example, when the shutter speed becomes one second or more, the exposure time is lengthened. Accordingly, there is a high possibility of generating image blurring due to camera shake or the subject moving at high speed. On the other hand, when the shutter speed becomes 1/1000 second or less, the exposure time is shortened. Accordingly, there is a low possibility of generating image blurring due to camera shake or subject blurring.

Figure 3A:
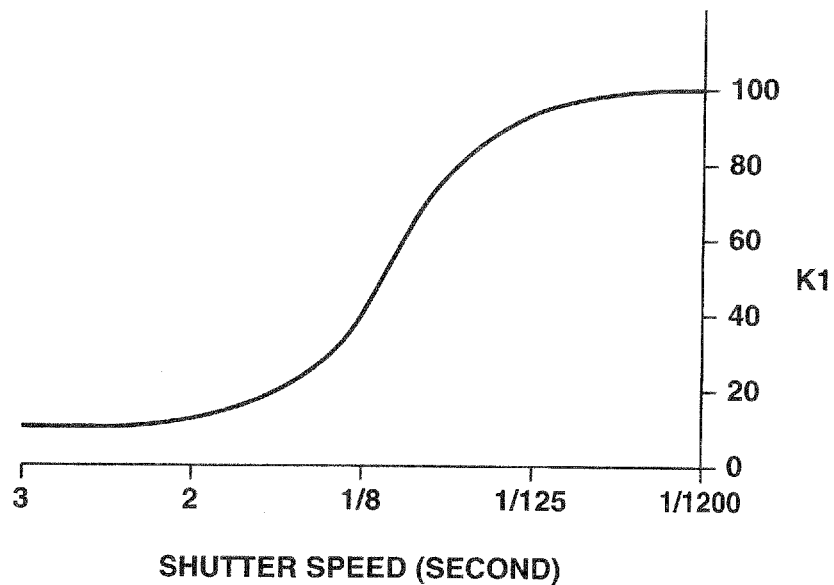
FIG. 3A is a graph showing a relationship between a shutter speed and a coefficient K1.

FIG. 3A shows a relationship between the shutter speed and the coefficient K1, which is included in the control program stored in the memory 12.

In FIG. 3A, the coefficient K1 is increased as the shutter speed is increased, and the coefficient K1 finally becomes 100.

The coefficient K1 is rapidly increased when the shutter speed exceeds about 2 (seconds), and the coefficient K1 is gently increased when the shutter speed exceeds about 1/125 (second). When the shutter speed is longer than about 2 seconds, the exposure time is lengthened, which easily generates image blurring. On the other hand, when the shutter speed is shorter than about 1/125 second, the exposure time is shortened, and this reduces image blurring. Accordingly, when the shutter speed is longer than about 2 seconds, and when the shutter speed is shorter than about 1/125 second, the coefficient K1 is not largely changed. When the shutter speed ranges from about 2 seconds to about 1/125 second, because the change in shutter speed has a large influence on the generation of image blurring, the coefficient K1 is largely changed. It is not always necessary that the relationship between the shutter speed and the coefficient K1 be limited to that in FIG. 3A. It is only necessary to increase the coefficient K1 as the shutter speed is increased.

The coefficient K2 is determined in relation to the focal distance in recording a still image.

The focal distance has an influence on the degree of image blurring of the recorded image. For example, when a focal distance exists in a telescopic distance of about 300 mm, which increases the optical zoom magnification, there is a high possibility of generating image blurring due to camera shake or the subject moving at high speed. On the other hand, when focal distance exists in a wide-angle distance of about 25 mm, which lowers the optical zoom magnification, there is a low possibility of generating image blurring due to camera shake or subject blurring.

Figure 3B:
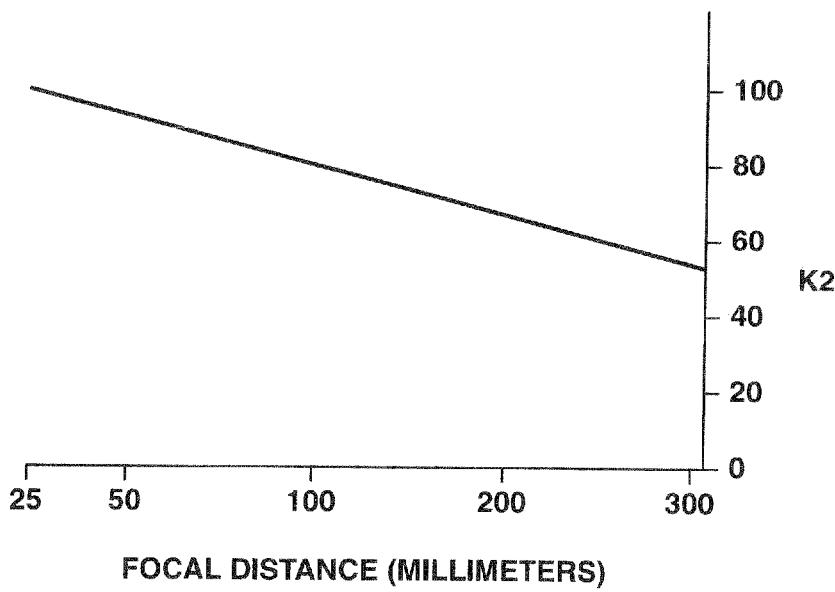
FIG. 3B is a graph showing a relationship between a focal distance and a coefficient K2.

FIG. 3B shows a relationship between the focal distance and the coefficient K2, which is included in the control program stored in the memory 12.

In FIG. 3B, the coefficient K2 becomes 100 when the focal distance is the shortest (for example, focal distance 25 mm), and the coefficient K2 is gradually decreased as the focal distance is lengthened.

It can be thought that the focal distance is multiplexed in the moving amount per unit time of the motion vector detected by the motion vector detection unit 15.

Accordingly, the change in coefficient K2 becomes gentle.

It is not always necessary that the relationship between the focal distance and the coefficient K2 be limited to FIG. 3B. It is only necessary to increase the coefficient K2 as the focal distance is lengthened.

When the blur estimated value dV which is obtained by substituting the coefficient K1, the coefficient K2, and the coefficient dP (average value of moving amounts of the motion vectors of pixel regions or the moving amount of the largest motion vector) of the recently-detected motion vector in Eq. 1 is not lower than the set threshold S (S1 to S3), the CPU 10 performs processing for automatically recording the image photographed at that time. For example, the coefficient K1 is increased because the possibility of generating image blurring is lowered as the shutter speed is increased, and the coefficient K2 is increased because the possibility of generating image blurring is lowered as the focal distance is shortened. The image photographed at that time is automatically recorded when the obtained blur estimated value dV is larger than the set threshold S.

B-2. Relationship Between Pan Auto Shutter and Automatic Recording Condition

In the case of the pan auto shutter, the condition that the shutter is pressed is substantially similar to that of B-1. In the "pan auto shutter", the image photographed at that time is automatically recorded when the calculated blur estimated value dV is not lower than the threshold S (S1 to S3) corresponding to the sensitivity level set in the pan auto shutter mode.

The blur estimated value dV is calculated by Eq. 1.

The automatic recording condition in the pan auto shutter differs from that in the anti blur auto shutter of B-1 in the pixel region (pixel region of the focused motion) where the moving amount dP of the motion vector used in calculating the blur estimated value dV is detected. In the pan auto shutter, the coefficient K1 and the coefficient K2 are similar to those of B-1.

Figure 4:
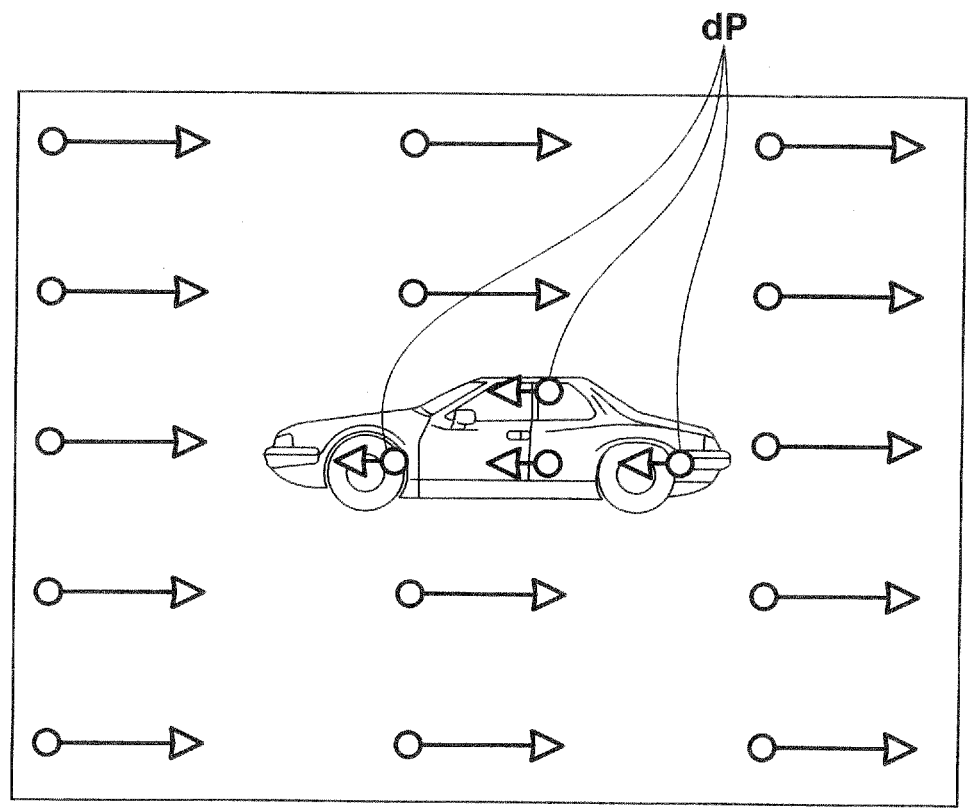
FIG. 4 shows a state of a motion vector detected in panning a main subject.

FIG. 4 shows the state of the motion vector detected in panning a main subject (in this case, running car), that is, when the photographing optical axis of the digital camera 1 follows the moving main subject in the state of the live view display.

In the photographed image of FIG. 4, motion vectors of pixel regions except for the main subject have substantially the same moving amount in substantially the same direction, and the motion vector of the pixel region corresponding to the main subject differs from the motion vectors of the pixel regions except for the main subject in both the direction and the moving amount. Therefore, the moving amount of the motion vector in the different region (the pixel region corresponding to the main subject) is used as the coefficient dP of Eq. 1. That is, a determination whether or not the recording is automatically performed is made based on the blurring only of the main subject.

The motion vector detection unit 15 determines that the pixel region of the motion vector having the same moving amount or moving direction as the motion vectors of the pixel regions in the corner of the photographed image are the region except for the main subject. The motion vector detection unit 15 determines that the region having the motion vector whose moving amount or moving direction is clearly different from that of the motion vector in the region except for the main subject is the main subject region. The motion vector detection unit 15 determines the moving amount dP of the motion vector in the main subject region. The moving amount dP of Eq. 1 may be an average value of the moving amounts of the motion vectors in the pixel regions which are detected as the main subject, or the moving amount dP may be the largest moving amount of the motion vector in the moving amounts of the motion vectors in all the pixel regions of the main subject regions.

B-3. Relationship Between Smile Detection Auto Shutter and Automatic Recording Condition In the automatic recording condition of the smile detection auto shutter, a smile estimated value dS calculated from Eq. 2 is not lower than the threshold S (S1 to S3) corresponding to the sensitivity level set in the smile detection auto shutter mode.

$$dS = (\text{average value of } K3) \times K4 \qquad \text{(Eq. 2)}$$

A coefficient K3 and a coefficient K4 in Eq. 2 will be described below.

The coefficient K3 is defined according to a degree of coincidence (degree of similarity) with a full smile in a facial expression of a person. In the facial expression of the person in the photographed image, the degree of smile is increased as the degree of coincidence is increased, and the degree of smile is lowered as the degree of coincidence is decreased.

That is, based on a full smile, the coefficient K3 is changed as the degree of smile is changed in the facial expression of the person in the photographed image.

Figure 5A:
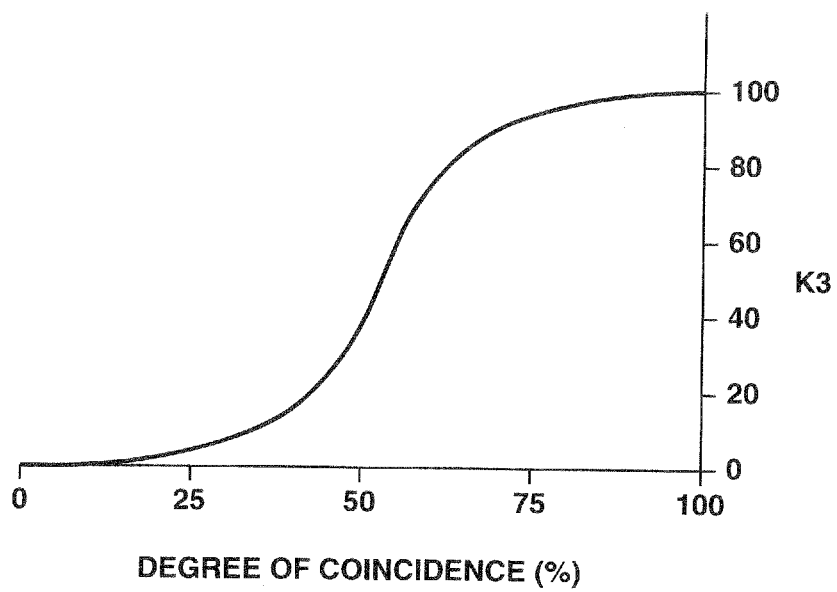
FIG. 5A is a graph showing a relationship between a degree of smile coincidence (degree of similarity to a full smile) (%) and a coefficient K3.

FIG. 5A shows a relationship between the coefficient K3 and the degree of coincidence (%) of a full smile with the facial expression of the person in the photographed image.

In FIG. 5A, as the degree of coincidence is increased, the coefficient K3 is increased and finally the coefficient K3 becomes 100. The coefficient K3 is rapidly increased when the degree of coincidence exceeds about 30%, and the coefficient K3 is gently increased when the degree of coincidence exceeds about 70%. The degree of coincidence of a smile shall mean the degree of coincidence between feature data indicating a shape of an eye or a shape of a mouth in the full smile previously written in the memory 12 and feature data indicating a shape of an eye or a shape of a mouth in the human face in the photographed image. Accordingly, the degree of coincidence of a smile becomes 100% in the case where both pieces of the feature data completely match each other, the degree of coincidence of a smile is lowered as the percentage is decreased, and the person is not smiling at all when the degree of coincidence of a smile becomes 0%. In the case where the photographed image includes plural persons, the degree of coincidence is obtained for all the persons.

The coefficient K4 of Eq. 2 is set according to a ratio of the number of smiling persons to the total number of persons in the case where the photographed image includes plural persons.

Figure 5B:
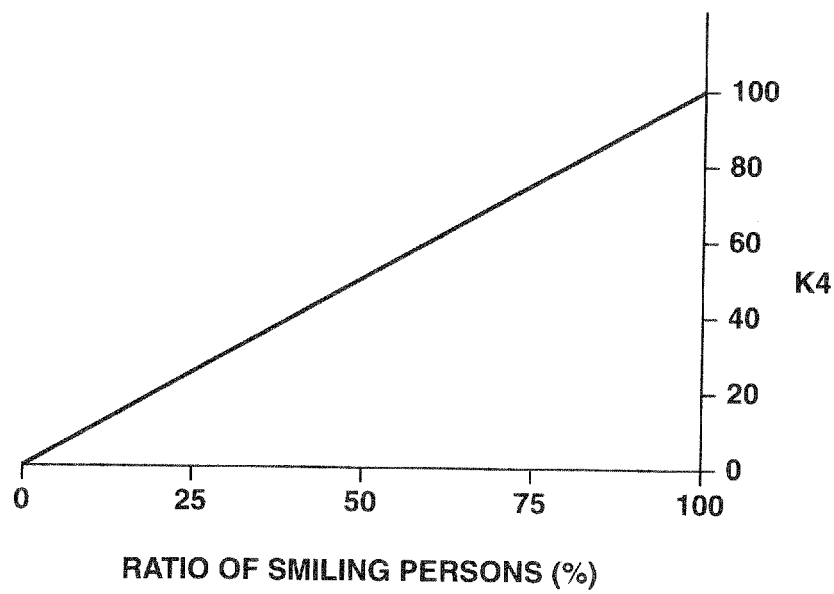
FIG. 5B is a graph showing a relationship between a ratio of smiling persons and a coefficient K4.

FIG. 5B shows a relationship between the ratio of smiling persons and the coefficient K4.

In FIG. 5B, the coefficient K4 becomes zero when the ratio of the number of smiling persons to the total number of persons included as subjects becomes 0%, the coefficient K4 is increased as the ratio is increased, and finally the ratio becomes 100.

The ratio is obtained by dividing the number of smiling persons by the total number of persons included as subjects. For example, the ratio becomes 80% when the number of smiling persons (faces) is four while the total number of persons (faces) included as subjects is five.

The number of smiling persons is defined by the degree of smile coincidence. A face which is not lower than the degree of smile coincidence set by a user or a predetermined degree of coincidence (for example, 20%) is detected as a smiling face. Because the determination of "smiling face" is made based on how much the person is smiling, a smiling face and non-smiling face are distinguished from each other by the degree of coincidence which is previously set by the user.

For example, even a non-smiling face is detected as a smiling face when a smiling face is set as a face in which the degree of smile coincidence is not lower than 0%. A face with at least a slight smile is detected as a smiling face when a smiling face is set as a face in which the degree of smile coincidence is not lower than 25%. A face with a full smile is detected as a smiling face when a smiling face is set as a face in which the degree of smile coincidence is not lower than 80%.

Using Eq. 2, the smile estimated value dS is calculated by multiplying the average value of the coefficients K3 corresponding to the degree of smile coincidence in the smiling persons and the coefficient K4 corresponding to the ratio of the number of smiling persons to the total number of persons included as subjects. When the calculated smile estimated value dS is not lower than the threshold S (S1 to S3) corresponding to the sensitivity level set in the smile detection auto shutter mode, the photographed image is automatically recorded at that time. Accordingly, sometimes the shutter is released due to a high coefficient K4 even if the average value of the coefficients K3 is low, and sometimes the shutter is released due to a high average value of the coefficients K3 even if the coefficient K4 is low. That is, irrespective of the average value of the coefficients K3 and the coefficient K4, the photographed image is automatically recorded as long as the smile estimated value dS is not lower than the threshold S (S1 to S3).

C. Digital Camera Operation

An operation of the digital camera 1 of the first embodiment, which is divided into a setting operation and a photographing operation, will be described.

C-1. Auto Shutter Mode Setting Operation

An auto shutter mode setting operation will be described with reference to flowcharts of FIGS. 6 and 7.

When the auto shutter mode setting operation is started, the CPU 10 starts display of sensitivity level setting screens of various auto shutter modes (step S1). An example of a displayed sensitivity level setting screen will be described later. The auto shutter setting mode can be set by operation of the mode switching key, and can be set by operating the menu key in the live view display or the reproduction mode.

The CPU 10 detects the selection of a given auto shutter mode (step S2). It is assumed that the CPU 10 detects the selection of the anti blur auto shutter.

The CPU 10 obtains the sensitivity level set in the selected auto shutter mode (step S3). The sensitivity level corresponding to the region where the level setting flag is set at "1" is obtained in the selected auto shutter mode of the auto shutter condition table 121.

For example, when the selected auto shutter mode is the anti blur auto shutter in the auto shutter condition table 121 of FIG. 2A, Lv. 1 is obtained as the sensitivity level (set sensitivity level) corresponding to the region where the level setting flag is set at "1".

The CPU 10 displays a caption of the selected auto shutter mode and an indicator indicating the obtained sensitivity level on a sensitivity level setting screen (step S4). A table in which various auto shutter modes and captions thereof are recorded is stored in the memory 12, and the caption of the selected auto shutter mode is obtained from the table and displayed as shown in FIG. 8A.

Figure 8A:
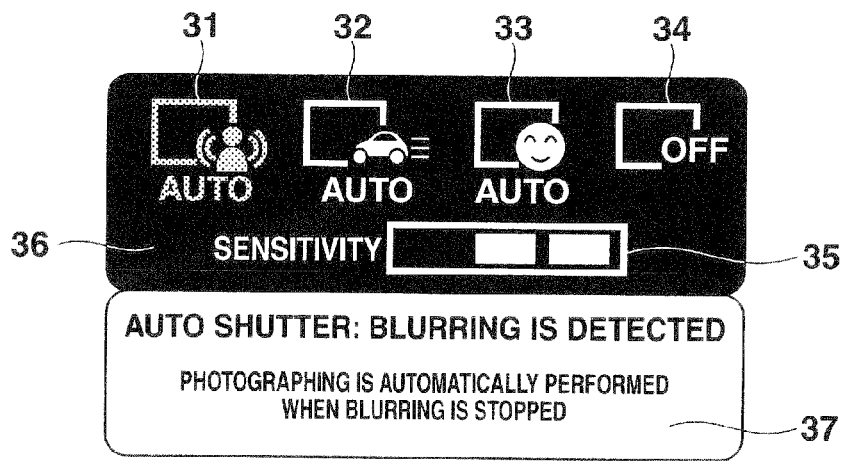
FIG. 8A shows an anti blur auto shutter function setting screen.
Figure 8B:
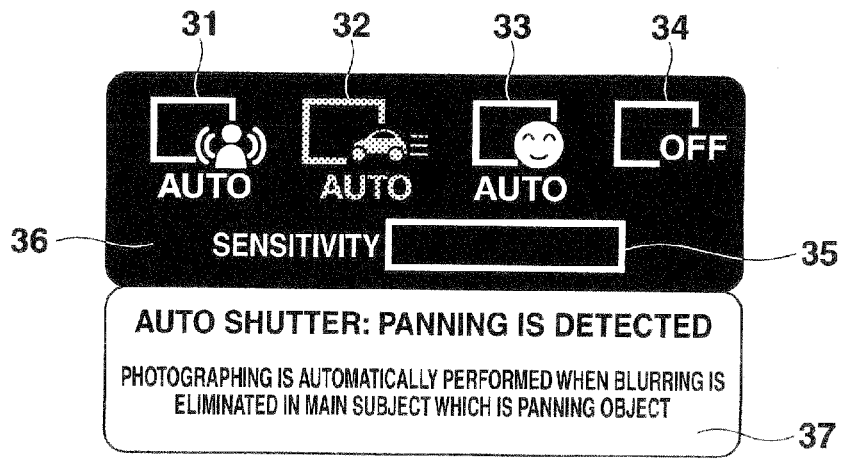
FIG. 8B shows a pan auto shutter function setting screen.
Figure 8C:
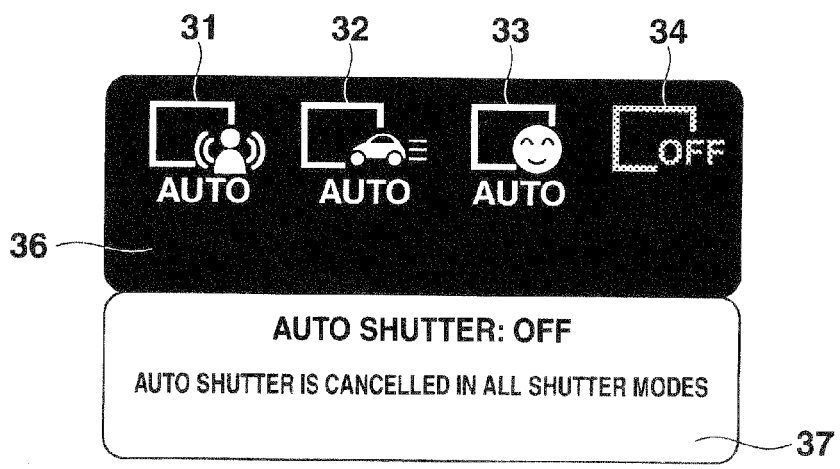
FIG. 8C shows a setting screen when an auto shutter is set off.

In FIGS. 8A-8C, an icon 31 indicating the anti blur auto shutter mode, an icon 32 indicating the pan auto shutter mode, an icon 33 indicating the smile detection auto shutter mode, and an icon 34 indicating that the auto shutter mode is turned off, and an indicator 35 indicating the sensitivity level are displayed in a display region 36. The kind of the auto shutter mode and the caption of the auto shutter mode are displayed in a display region 37.

Of the icons 31 to 34, only the icon 31 is displayed dark, which shows the user which icon is currently selected. The indicator 35 indicates the sensitivity level of the currently selected auto shutter mode. Three rectangles are horizontally arranged in the indicator 35, and the rectangles are dimly displayed from the left according to the set sensitivity level. Specifically, the rectangles are not dimly displayed in the case of the sensitivity level of Lv. 0, the left rectangle is dimly displayed in the case of the sensitivity level of Lv. 1, the left and central rectangles are dimly displayed in the case of the sensitivity level of Lv. 2, and all the rectangles are dimly displayed in the case of the sensitivity level of Lv. 3.

In FIG. 8A, because the selected auto shutter mode is the anti blur auto shutter mode, the icon 31 is dimly displayed. The sensitivity level set in the anti blur auto shutter mode is displayed by the indicator 35. The kind of the selected auto shutter mode and the caption that the shutter is released under a certain circumstance in the selected auto shutter mode are displayed.

Because no auto shutter modes are selected in starting the display of the sensitivity level setting screen in step S1, only the icons 31 to 34 are displayed, although the indicator 35 indicating the sensitivity level, the kind of the selected auto shutter mode, and the caption thereof are not displayed. When one of the auto shutter modes is selected, the indicator, the caption, and the like are displayed according to the selected auto shutter mode.

When the explanation of the auto shutter mode and the display of the indicator 35 are performed in step S4, the CPU 10 determines whether or not the SET key is operated by the user (step S5). The determination in step S5 is made based on whether or not the operation signal corresponding to the operation of the SET key is transmitted from the key input unit 11. When the user operates the SET key in order to change the sensitivity level of the currently selected auto shutter mode, the CPU 10 determines whether a sensitivity level change is present or absent by detecting the operation of the SET key.

When the CPU 10 determines that the SET key is not operated in step S5, the CPU 10 determines whether or not another auto shutter mode is designated by the user (step S6).

When the CPU 10 determines that another auto shutter mode is designated in step S6, the CPU 10 selects the designated auto shutter mode (step S7), and the flow returns to step S3. In step S3, the CPU 10 obtains the sensitivity level set in the selected auto shutter mode, the indicator indicating the obtained sensitivity level and the like are displayed (step S4), and the flow goes to step S5.

When the user operates "→" or "↓" of the arrow key while the sensitivity level setting screen of FIG. 8A is displayed, the selection is performed in each time in the order of pan auto shutter mode → smile detection auto shutter mode → turn-off of auto shutter mode. In FIG. 8A, when the user operates "←" or "↑" of the arrow key while the sensitivity level setting screen is displayed, the selection is performed in each time in the order of turn-off of auto shutter mode → smile detection auto shutter mode → pan auto shutter mode.

Figure 7:
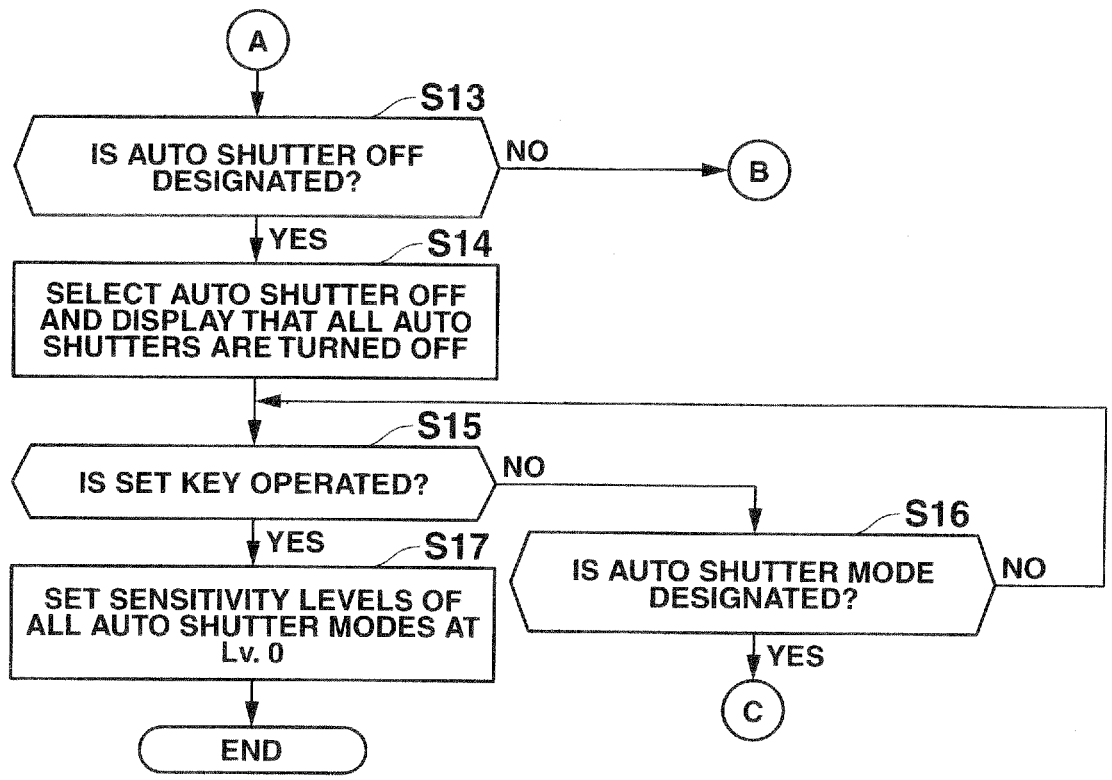
FIG. 7 is a flowchart showing the auto shutter mode setting operation.

When the auto shutter mode is designated in step S6, the CPU 10 determines that the turn-off of auto shutter mode is designated in step S13 of FIG. 7.

FIG. 8B shows a state of the sensitivity level setting screen displayed in step S4 when the pan auto shutter mode is selected.

In FIG. 8B, the icon 32 is dimly displayed, and Lv. 0 is displayed as the sensitivity level set in the pan auto shutter mode in the indicator 35. The pan auto shutter mode which is the kind of the currently selected auto shutter mode and the caption of the pan auto shutter mode are displayed.

Thus, the sensitivity level setting screen and the caption are switched each time the auto shutter mode is selected.

When determining that the SET key is operated in step S5, the CPU 10 determines whether or not the sensitivity level change is operated (step S8). The determination in step S8 is made based on whether or not the operation signal corresponding to the operation of the arrow key is transmitted from the key input unit 11.

When determining that the setting of the sensitivity level is changed in step S8, the CPU 10 changes the sensitivity level indicated by the indicator in response to the operation (step S9), and the flow goes to step S10.

The sensitivity level indicated by the indicator is incremented by one each time the user operates a "→" or "↓" arrow key, and the sensitivity level indicated by the indicator is decremented by one each time the user operates a "←" or "↑" arrow key. When the sensitivity level becomes the maximum (Lv. 3), the sensitivity level is not incremented any more even if the user operates a "→" or "↓" arrow key. When the sensitivity level becomes the minimum (Lv. 0), the sensitivity level is not decremented any more even if the user operates a "←" or "↑" arrow key.

While the sensitivity level setting screen is displayed as shown in FIG. 8A, the SET key is operated (YES in step S5), and the "→" arrow key is operated (YES in step S8). Therefore, the indicator 35 indicates the sensitivity level of Lv. 2. On the contrary, when the "←" arrow key is operated, the indicator 35 indicates the sensitivity level of Lv. 0.

That is, even if a sensitivity level change is operated at this point, only the sensitivity level indicated by the indicator is changed, and the set sensitivity level is not changed.

When the CPU 10 determines that the sensitivity level change is not operated in step S8, the flow directly goes to step S10.

In step S10, the CPU 10 determines whether or not the SET key is operated. The user operates the SET key when the setting is changed to the sensitivity level indicated by the indicator 35.

When determining that the SET key is not operated in step S10, the CPU 10 determines whether or not the user operates the cancel key (step S11). The determination in step S11 is made based on whether or not the operation signal corresponding to the operation of the cancel key is transmitted from the key input unit 11. The user operates the cancel key when cancelling the sensitivity level change of the currently selected auto shutter mode.

The flow returns to step S8 when the CPU 10 determines that the cancel key is not operated in step S11, and the flow returns to step S5 when the CPU 10 determines that the cancel key is operated in step S11.

When determining that the SET key is operated in step S10, the CPU 10 changes the sensitivity level of the currently selected auto shutter mode to the sensitivity level currently indicated by the indicator 35 (step S12).

The sensitivity level change is performed by updating the state of the level setting flag in the currently selected auto shutter mode of the auto shutter condition table 121. That is, the level setting flag in the currently selected auto shutter mode of the auto shutter condition table 121 is set at "0", and the level setting flag is set at "1" in the region corresponding to the sensitivity level indicated by the indicator in operating the SET key.

For example, when the sensitivity level indicated by the indicator is Lv. 2 in operating the SET key while the anti blur auto shutter mode is selected, the level setting flag of the anti blur auto shutter mode of the auto shutter condition table 121 shown in FIG. 2 is set at "0", and the level setting flag is set at "1" in the region corresponding to the sensitivity level of Lv. 2.

When the CPU 10 determines that the SET key is not operated in step S5, and that another auto shutter mode is not designated in step S6, the flow goes to step S13 of FIG. 7, and the CPU 10 determines whether or not the user designates the turn-off of the auto shutter mode.

Figure 6:
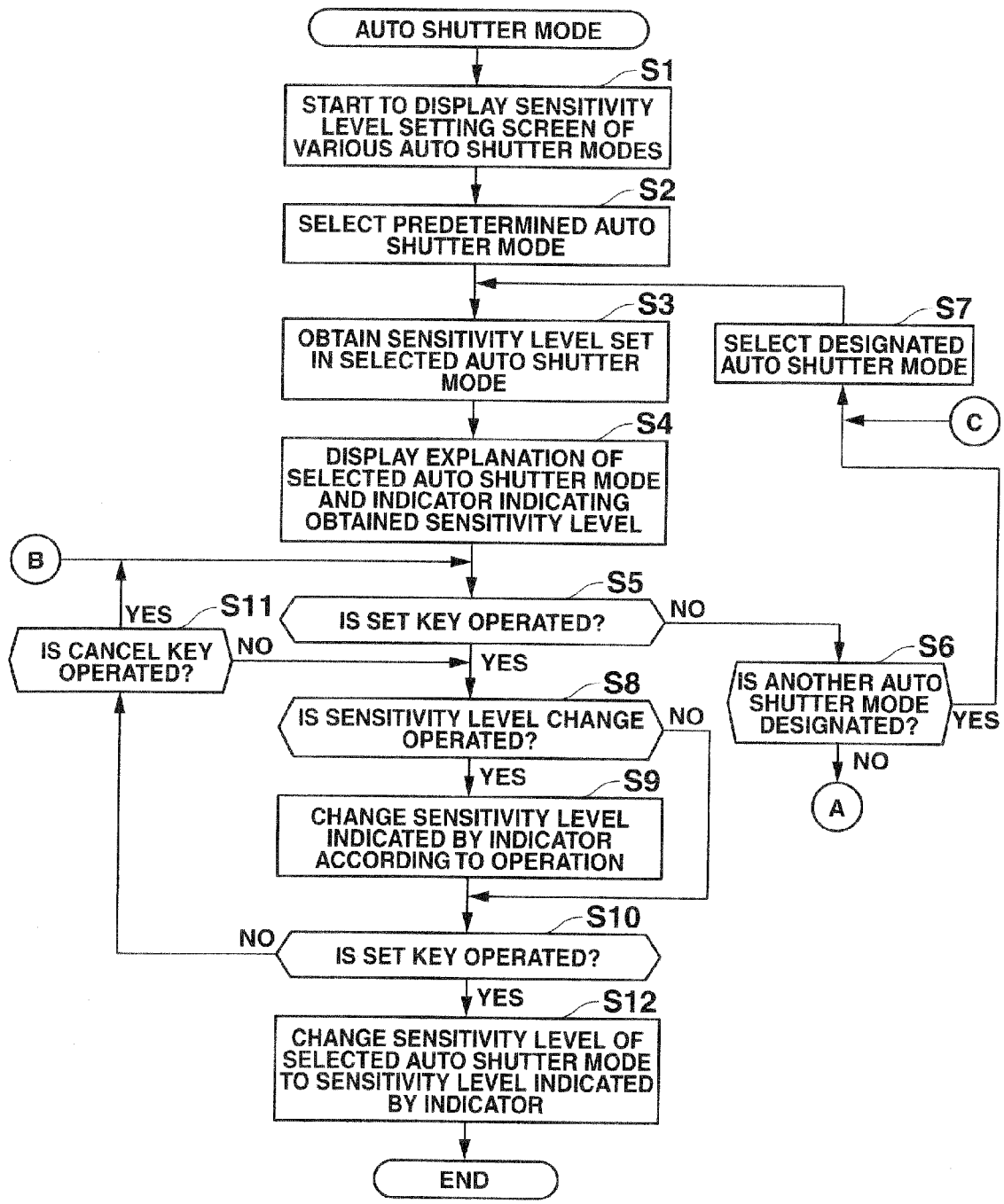
FIG. 6 is a flowchart showing an auto shutter mode setting operation.

When the CPU 10 determines that the turn-off of the auto shutter mode is not designated in step S13, the flow returns to step S5 of FIG. 6.

When the CPU 10 determines that the turn-off of the auto shutter mode is designated in step S13, the CPU 10 selects the turn-off of the auto shutter mode to display that all the auto shutter modes are turned off on the level setting screen (step S14).

FIG. 8C shows an example of the sensitivity level setting screen which is displayed when the turn-off of the auto shutter mode is selected.

In FIG. 8C, the turn-off of the auto shutter mode and the caption thereof are displayed while the icon 34 indicating the turn-off of the auto shutter mode is dimly displayed. The indicator indicating the sensitivity level is not displayed. This is because the sensitivity levels of the various auto shutter modes are uniformly set at Lv. 0 in the case of the turn-off of the auto shutter mode. Although the indicator 35 indicating the sensitivity level of Lv. 0 may be displayed, the user cannot change the sensitivity level.

The CPU 10 determines whether or not the user operates the SET key (step S15).

When the CPU 10 determines that the SET key is not operated in step S15, the flow goes to step S16. In step S16, the CPU 10 determines whether or not the user designates the auto shutter mode.

When the CPU 10 determines that the user designates the auto shutter mode in step S16, the flow goes to step S7 of FIG. 6. When the CPU 10 determines that the user does not designate the auto shutter mode, the flow returns to step S15.

When determining that the SET key is operated in step S15, the CPU 10 sets the sensitivity levels of all the auto shutter modes at Lv. 0 (step S17).

The setting is performed by updating the state of the level setting flag in the currently selected auto shutter mode of the auto shutter condition table 121. That is, the level setting flag is set at "1" only in the region where the sensitivity level of the auto shutter mode of the auto shutter condition table 121 corresponds to Lv. 0, and the level setting flag is set at "0" in other regions corresponding to the sensitivity level (Lv. 1 to Lv. 3).

C-2. Auto Shutter Mode Photographing Operation

A photographing operation will be described with reference to flowcharts of FIGS. 9 to 12.

When the user sets the photographing mode by operating the mode switching key of the key input unit 11, the so-called live view display is started in step S31. In the live view display, the CPU 10 causes the CCD 5 to start to photograph the subject, the image producing unit 17 sequentially produces the luminance color-difference signal frame image data, the luminance color-difference signal frame image data is stored in the buffer memory (DRAM 13), and then displayed on the display unit 20.

The CPU 10 determines whether or not the auto shutter mode is turned off (step S32). In the case where the sensitivity levels of all the auto shutter modes are set at Lv. 0, the CPU 10 determines that the auto shutter mode is turned off.

When the CPU 10 determines that the auto shutter mode is turned off in step S32, the flow directly goes to step S41. When determining that the auto shutter mode is not turned off in step S32, the CPU 10 determines whether or not the user operates the auto shutter mode key (step S33). The determination in step S33 is made based on whether or not the operation signal corresponding to the operation of the auto shutter mode key is transmitted from the key input unit 11.

When determining that the user operates the auto shutter mode key in step S33, the CPU 10 superimposes a list of various auto shutter modes on the sequentially photographed image in the live view display (step S34). In the list of auto shutter modes, names of the auto shutter modes may be displayed or the icons may be displayed.

The CPU 10 determines which auto shutter mode is selected by the user (step S35).

The selection is performed from the list of auto shutter modes by detecting the user operation of the arrow key, and the determination of the selection is performed by detecting the operation of the SET key.

When determining that one of the auto shutter modes is not selected by the user, the CPU 10 maintains the state in step S35 until one of the auto shutter modes is selected. When determining that one of the auto shutter modes is selected by the user, the CPU 10 sets the selected auto shutter mode (step S36). Therefore, the auto shutter is performed in the set auto shutter mode. The setting is updated when another auto shutter mode is newly set while the auto shutter mode is already set.

The CPU 10 obtains the threshold S corresponding to a sensitivity level from the threshold table 122 while obtaining the sensitivity level set in the set auto shutter mode from the auto shutter condition table (step S37).

That is, as shown in FIG. 2, the CPU 10 specifies the threshold S corresponding to the sensitivity level set in the set auto shutter mode from the auto shutter condition table 121, and obtains the threshold S from the threshold table 122.

The CPU 10 starts processing for superimposing information indicating the set auto shutter mode and the indicator indicating the obtained sensitivity level on the live view (step S38), and the flow goes to step S39. The information indicating the set auto shutter mode may be the name or icon of the auto shutter mode. The indicator is the indicator 35 of FIGS. 8A-8C.

Figure 13:
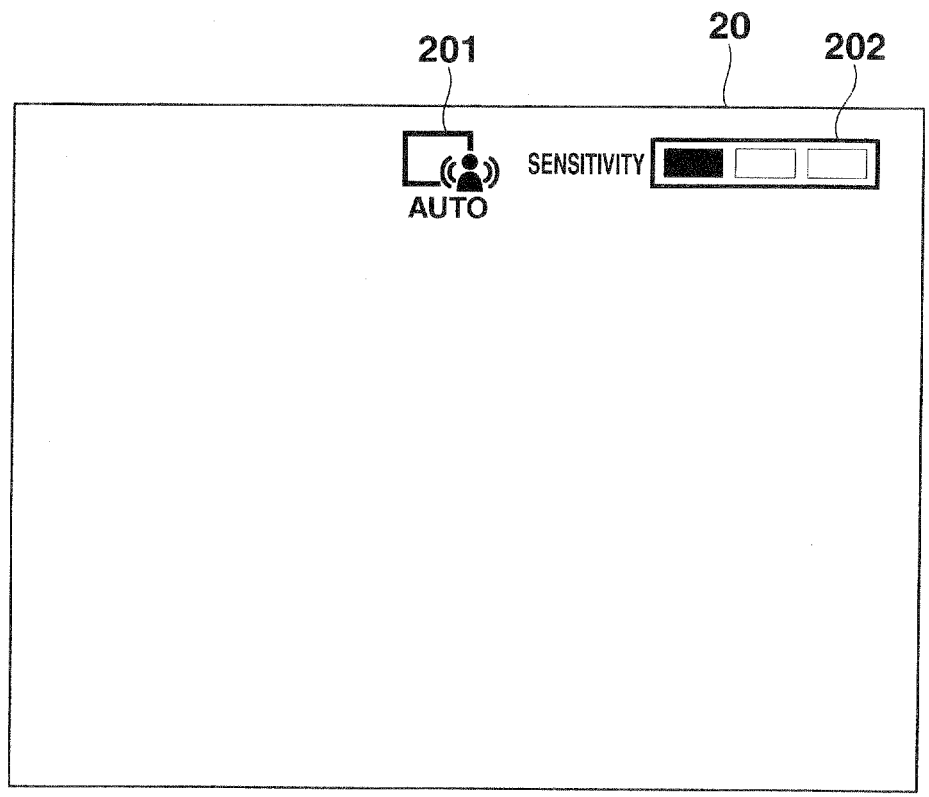
FIG. 13 shows examples of information indicating a set auto shutter mode and an indicator which are superimposed on a live view.

FIG. 13 shows states of the information indicating the set auto shutter mode and the indicator, which are displayed while superimposed on the live view.

FIG. 13 shows the information (in this case, icon) indicating the set auto shutter mode and the indicator, which are set while superimposed on the live view. Therefore, the user can easily recognize the currently set auto shutter mode and sensitivity level.

On the other hand, when the CPU 10 determines that the user does not operate the auto shutter mode key in step S33, the flow directly goes to step S39.

In step S39, the CPU 10 determines whether or not the user operates the auto shutter mode release key. The determination in step S39 is made based on whether or not the operation signal corresponding to the operation of the auto shutter mode release key is transmitted from the key input unit 11.

When determining that the user operates the auto shutter mode release key in step S39, the CPU 10 releases the setting of the auto shutter mode (step S40), and the flow goes to step S41. When the CPU 10 determines that the user does not operate the auto shutter mode release key in step S39, the flow directly goes to step S41.

When the auto shutter mode is not set in step S36, even if the auto shutter mode release key is operated, the flow does not go to step S40, hut directly goes to step S41.

In step S41, the CPU 10 determines whether or not the user performs zoom operation. The determination in step S41 is made based on whether or not the operation signal corresponding to the operation of the zoom key ("T" key and "W" key) is transmitted from the key input unit 11.

When determining that the user performs a zoom operation in step S41, the CPU 10 moves the zoom lens according to the operation (step S42), and the flow goes to step S43.

At this point, the zoom lens is moved toward the telescopic side when the "T" key is operated, and the zoom lens is moved toward the wide-angle side when the "W" key is operated. The focal distance is changed by the movement of the zoom lens.

On the other hand, when the CPU 10 determines that the user does not perform a zoom operation in step S41, the flow directly goes to step S43.

In step S43, the CPU 10 determines whether or not the user presses halfway the shutter button. The determination in step S43 is made based on whether or not the operation signal corresponding to the halfway press operation of the shutter button is transmitted from the key input unit 11.

When the CPU 10 determines that the user does not press halfway the shutter button in step S43, the flow returns to step S32. When the CPU 10 determines that the user presses halfway the shutter button in step S43, the flow goes to step S51 of FIG. 10.

Figure 10:
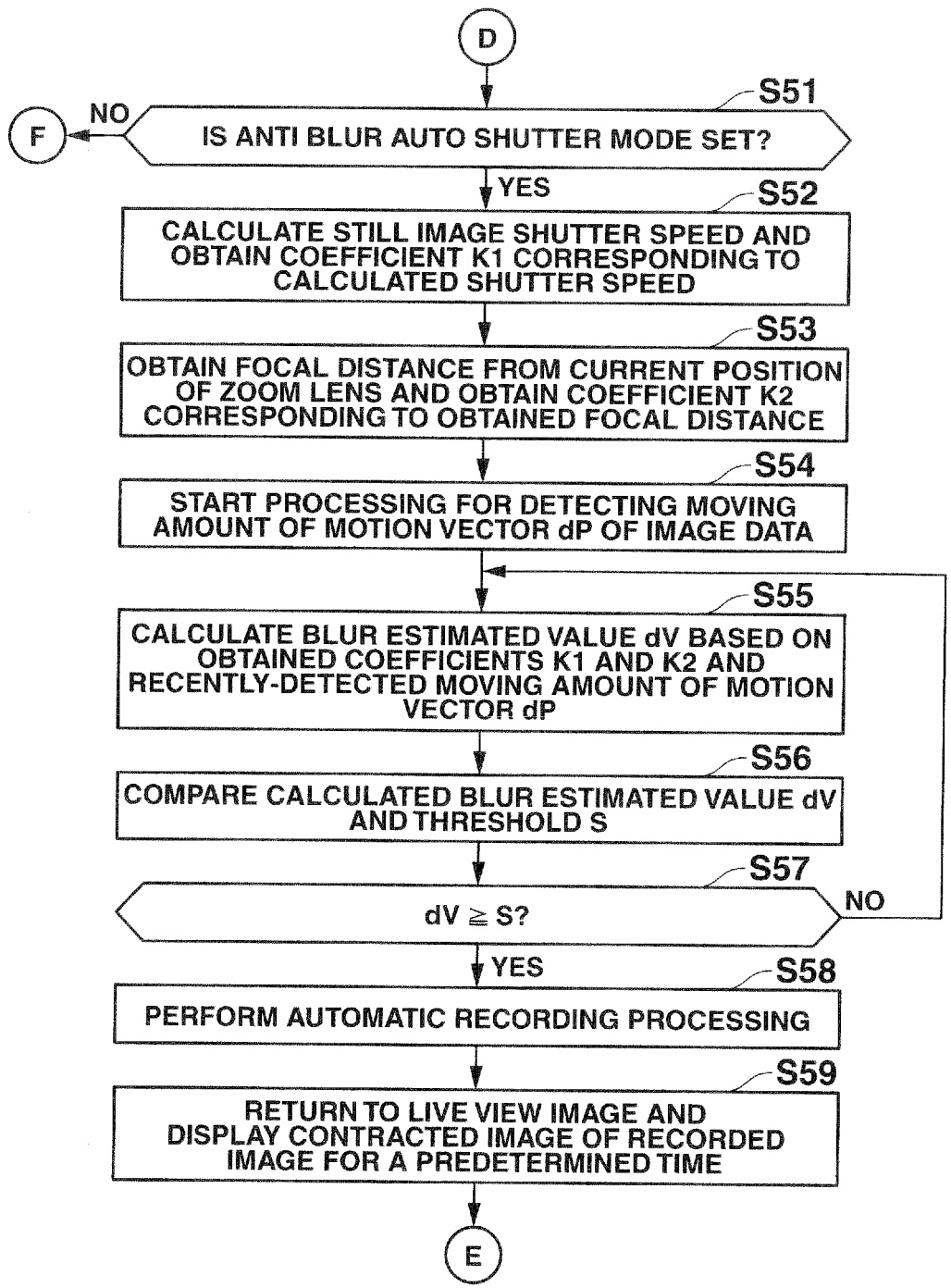
FIG. 10 is a flowchart showing an anti blur auto shutter photographing operation.

In step S51 of FIG. 10, the CPU 10 determines whether or not the anti blur auto shutter mode is set.

When determining that the anti blur auto shutter mode is set in step S51, the CPU 10 calculates a still image shutter speed based on the image data photographed latest (image data sampled for the purpose of live view may be used), and obtains the coefficient K1 corresponding to the calculated shutter speed (step S52).

At this point, the diaphragm value is calculated while the still image shutter speed is calculated, that is, the still image photographing AE processing is performed.

The relationship shown in FIG. 3A is previously written in the memory 12, and the coefficient K1 corresponding to the calculated shutter speed is obtained based on the relationship of FIG. 3A. Alternatively, the coefficient K1 may be obtained by calculation based on a predetermined algorithm.

The CPU 10 obtains the focal distance from the current position of the zoom lens, and obtains the coefficient K2 corresponding to the obtained focal distance (step S53).

The relationship shown in FIG. 3B is previously written in the memory 12, and the coefficient K2 corresponding to the obtained focal distance is obtained based on the relationship of FIG. 3B. Alternatively, the coefficient K2 may be obtained by calculation based on a predetermined algorithm.

The CPU 10 supplies the sequentially photographed image data to the motion vector detection unit 15, and causes the motion vector detection unit 15 to start the processing for detecting the moving amount dP of the motion vector in each pixel region of each piece of image data (step S54). The detected moving amount dP of the motion vector in each pixel region of each piece of image data is transmitted to the CPU 10.

The CPU 10 calculates the blur estimated value dV based on the coefficient K1, the coefficient K2, and the moving amount dP of the motion vector in each pixel region of the image data detected latest (step S55). The blur estimated value dV is obtained from Eq. 1. The blur estimated value dV is obtained by substituting the largest moving amount of the motion vector in the average value of the moving amounts of the motion vectors detected latest and the motion vector of each pixel region for the moving amount dP of Eq. 1.

The CPU 10 compares the calculated blur estimated value dV and the threshold S (the set threshold in the thresholds S1 to S3) obtained in step S37 (step S56), and determines whether or not the blur estimated value dV is not lower than the threshold S (step S57). That is, the CPU 10 determines whether or not the set sensitivity level is satisfied.

When the CPU 10 determines that the blur estimated value dV is lower than the threshold S in step S57, the flow returns to step S55. In step S55, the above-described operation is repeatedly performed.

On the other hand, when determining that the blur estimated value dV is not lower than the threshold S in step S57, the CPU 10 performs the recording with the auto shutter, that is, the automatic recording processing (step S58).

The still image photographing processing is performed at the shutter speed and diaphragm value calculated in step S52, the image producing unit 17 performs the image processing on the still image data, the compression and expansion unit 22 compresses the still image data, and the still image data stored in the buffer memory is recorded in the flash memory 24.

The CPU 10 returns to the live view display, and starts the processing for superimposing a reduced-size image of the recorded still image data on the live view display for a predetermined time (step S59). Then the flow returns to step S38.

In the first embodiment, a reduced-size image of the recorded image is displayed. Alternatively, a message that the recording is performed by the auto shutter may be displayed. Thus, the user can recognize that the recording is performed by the auto shutter. The same holds true for step S72 of FIG. 11 and step S90 of FIG. 12.

Figure 11:
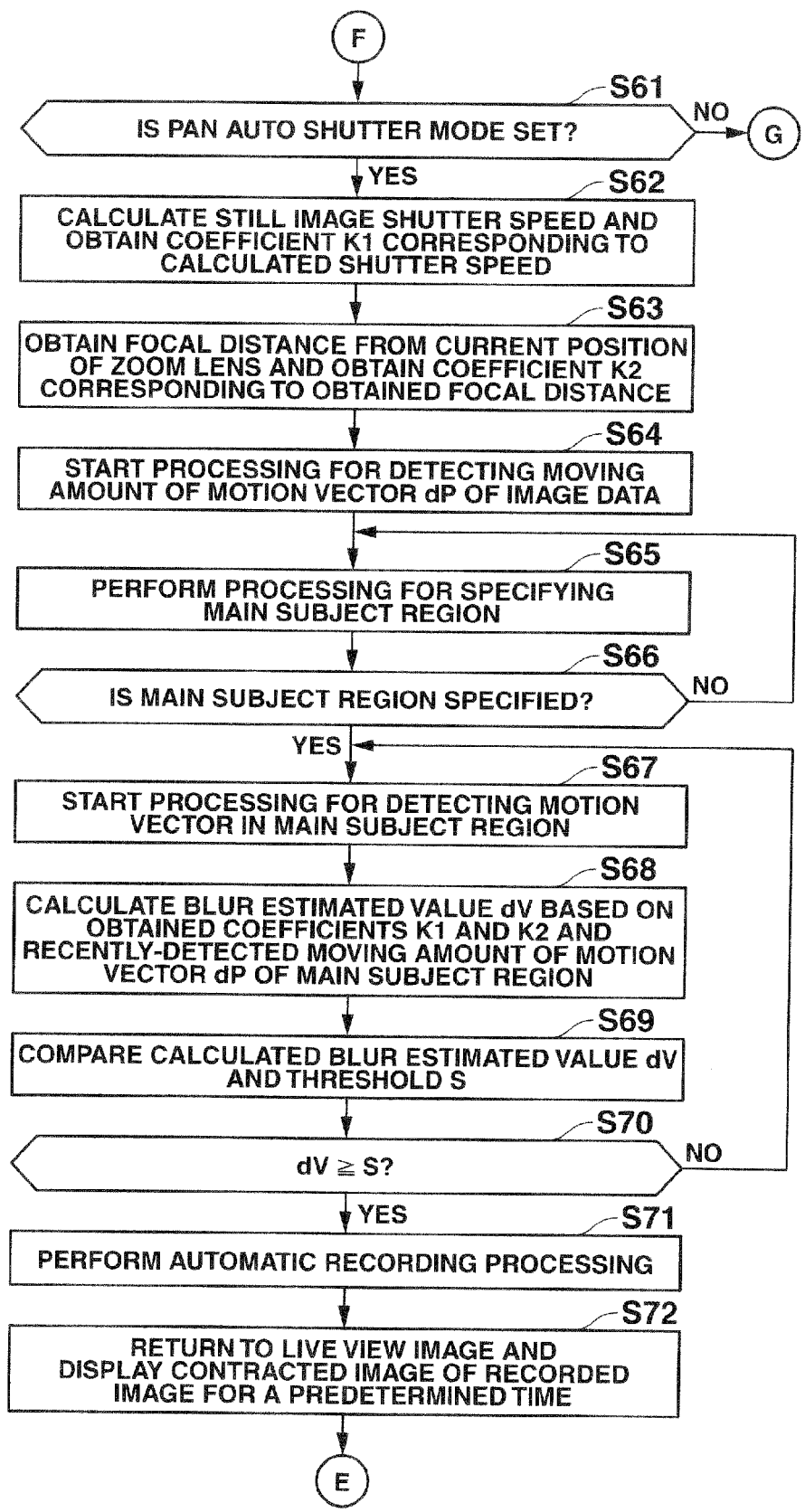
FIG. 11 is a flowchart showing a pan auto shutter photographing operation.

On the other hand, when the CPU 10 determines that the anti blur auto shutter mode is not set in step S51 of FIG. 10, the flow goes to step S61 of FIG. 11. In step S61, the CPU 10 determines whether or not the pan auto shutter mode is set.

When determining that the pan auto shutter mode is set in step S61, the CPU 10 calculates the still image shutter speed based on the image data photographed latest (image data thinned out for the purpose of live view may be used), and the CPU 10 obtains the coefficient K1 corresponding to the calculated shutter speed (step S62). The diaphragm value is calculated while the still image shutter speed is calculated, that is, the AE processing is performed.

The relationship shown in FIG. 3A is previously written in the memory 12, and the coefficient K1 corresponding to the calculated shutter speed is obtained based on the relationship of FIG. 3A. Alternatively, the coefficient K1 may be obtained by calculation based on a predetermined algorithm.

The CPU 10 obtains the focal distance from the current position of the zoom lens, and obtains the coefficient K2 corresponding to the obtained focal distance (step S63).

The relationship shown in FIG. 3B is previously written in the memory 12, and the coefficient K2 corresponding to the obtained focal distance is obtained based on the relationship of FIG. 3B. Alternatively, the coefficient K2 may be obtained by calculation based on a predetermined algorithm.

The CPU 10 supplies the sequentially photographed image data to the motion vector detection unit 15, and causes the motion vector detection unit 15 to start the processing for detecting the moving amount dP of the motion vector in each pixel region of each piece of image data (step S64).

The motion vector detection unit 15 performs the processing for specifying the main subject based on the detected moving amount dP of the motion vector in each pixel region (step S65). In the processing for specifying the main subject, the pixel region including the moving amount dP of the motion vector whose moving amount or moving direction is clearly different from that of the motion vector in the pixel regions of a peripheral portion of the image is specified as the main subject region.

The motion vector detection unit 15 determines whether or not the main subject region can be specified (step S66).

When the motion vector detection unit 15 determines that the main subject region cannot be specified in step S66, the flow returns to step S65. When the motion vector detection unit 15 determines that the main subject region can be specified in step S66, the motion vector detection unit 15 starts the processing for detecting only the moving amount dP of the motion vector in the main subject region (step S67). The detected amount dP of the motion vector in the main subject region is transmitted to the CPU 10.

In the first embodiment, only the moving amount dP of the motion vector in the main subject region is detected when the main subject region is specified. Alternatively, the motion vectors in all the pixel regions of the sequentially photographed image data may be detected to specify the main subject region.

The CPU 10 calculates the blur estimated value dV based on the coefficient K1, the coefficient K2, and the moving amount dP of the motion vector in the main subject region detected latest (step S68). The blur estimated value dV is obtained from Eq. 1. The blur estimated value dV is obtained by substituting the largest moving amount of the motion vector in the average value of the moving amounts of the motion vectors detected latest and the motion vector of each pixel region for the moving amount dP of Eq. 1.

The CPU 10 compares the calculated blur estimated value dV and the threshold S (the set threshold in the thresholds S1 to S3) obtained in step S37 (step S69), and determines whether or not the blur estimated value dV is not lower than the threshold S (step S70). That is, the CPU 10 determines whether or not the set sensitivity level is satisfied.

When the CPU 10 determines that the blur estimated value dV is lower than the threshold S in step S70, the flow returns to step S67. On the other hand, when determining that the blur estimated value dV is not lower than the threshold S in step S70, the CPU 10 performs the recording with the auto shutter, that is, the automatic recording processing (step S71).

The CPU 10 returns to the live view display, and starts the processing for superimposing the reduced-size image of the recorded still image data on the live view display for a predetermined time (step S72). Then the flow returns to step S38.

Figure 12:
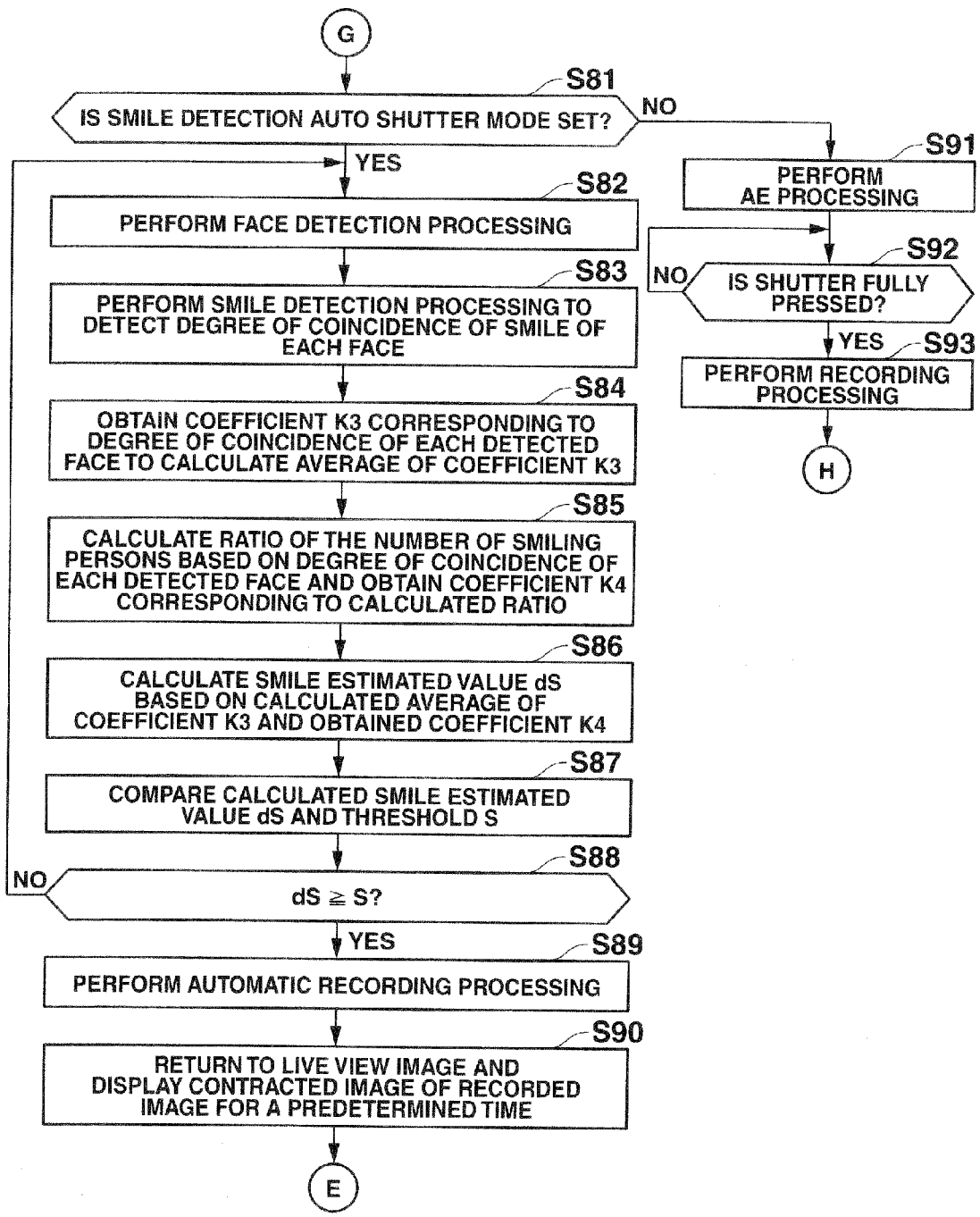
FIG. 12 is a flowchart showing a smile detection auto shutter photographing operation.

When the CPU 10 determines that the pan auto shutter mode is not set in step S61, the flow goes to step S81 of FIG. 12. In step S81, the CPU 10 determines whether or not the smile detection auto shutter mode is set.

When determining that the smile detection auto shutter mode is set in step S81, the CPU 10 performs face detection processing on the sequentially photographed image data (step S82). Although the face detection processing is not described in detail because it is a well known technique, where the face of the person exists is detected by the comparison and matching between the previously recorded feature data (feature data expressing shapes of eye, eyebrow, nose, mouth, and ear) of the face and the sequentially photographed image data.

The CPU 10 performs smile detection processing to the detected face to detect the degree of smile coincidence of the detected face (step S83).

Although the smile detection processing is also the well known technique, the degree of smile coincidence is detected by the comparison between the previously recorded smile feature data (feature data expressing shapes of eye or mouth in the smiling state) and the detected face. The smile feature data to be compared is the feature data of a face with a full smile.

The CPU 10 obtains the coefficients K3 corresponding to the degree of smile coincidence of the detected faces, and calculates the average value of the obtained coefficients K3 (step S84). The relationship shown in FIG. 5A is previously written in the memory 12, and the coefficient K3 corresponding to the detected face is obtained based on the relationship of FIG. 5A. Alternatively, the coefficient K3 may be obtained by calculation based on a predetermined algorithm.

The CPU 10 calculates the ratio of the number of smiling persons to the total number of persons included as subjects based on the degree of smile coincidence of the detected faces, and obtains the coefficient K4 corresponding to the calculated ratio (step S85).

The CPU 10 determines that a face having at least a degree of coincidence designated by the user or a predetermined degree of coincidence is a smiling face, and the ratio is calculated by dividing the number of smiling faces by the total number of detected faces. The relationship shown in FIG. 5B is previously written in the memory 12, and the coefficient K4 corresponding to the ratio of smiling persons is obtained based on the relationship of FIG. 5B. Alternatively, the coefficient K4 may be obtained by calculation based on a predetermined algorithm.

The CPU 10 calculates the smile estimated value dS based on the average value of the obtained coefficients K3 and the obtained coefficient K4 (step S86). The smile estimated value dV can be obtained from Eq. 2.

The CPU 10 compares the calculated smile estimated value dS and the threshold S obtained in step S37 (step S87), and determines whether or not the smile estimated value dS is not lower than the threshold S (step S88). That is, the CPU 10 determines whether or not the set sensitivity level is satisfied.

When the CPU 10 determines that the blur estimated value dV is lower than the threshold S in step S88, the flow returns to step S82. In step S82, the CPU 10 repeatedly performs the above-described operation.

On the other hand, when determining that the blur estimated value dV is not lower than the threshold S in step S88, the CPU 10 performs the recording with the auto shutter, that is, the automatic recording processing (step S89).

The CPU 10 returns to the live view display, and starts the processing for superimposing the reduced-size image of the recorded still image data on the live view display for a predetermined time (step S90). Then the flow returns to step S38.

When the CPU 10 determines that the smile detection auto shutter mode is not set in step S81, that is, that the auto shutter mode is turned off, or any auto shutter is not set, the CPU 10 performs the AE processing based on the image data photographed latest (step S91), thereby setting the still image photographing shutter speed and diaphragm value.

The CPU 10 determines whether or not the user fully presses the shutter button (step S92). The determination in step S92 is made based on whether or not the operation signal corresponding to the full press operation of the shutter button is transmitted from the key input unit 11.

When the CPU 10 determines that the user does not fully press the shutter button in step S92, the flow remains in step S92 until the user fully presses the shutter button. When determining that the user fully presses the shutter button, the CPU 10 performs the recording processing with the set shutter speed and diaphragm value (step S93). Then the flow returns to step S31.

Thus, according to the first embodiment, various kinds of auto shutter modes are provided, so that the automatic recording processing suitable for each photographing status can be performed.

The user sets the sensitivity level (automatic recording condition), so that the automatic recording processing can be performed under the desired condition of the user.

The blur estimated value dV or the smile estimated value dS is calculated based on the photographed frame image, and it is periodically determined whether or not the calculated blur estimated value dV or the smile estimated value dS satisfies (is not lower than) the threshold S corresponding to the set sensitivity level. The automatic recording processing is performed when the calculated blur estimated value dV or the smile estimated value dS satisfies the threshold S. Therefore, the automatic recording processing can be performed when the set sensitivity level is satisfied.

In the anti blur auto shutter mode, the blur estimated value dV is calculated based on the motion vector of the detected image, the shutter speed, and the focal distance (based on the plural factors). Therefore, how much blurring is generated by the automatic recording processing can properly be estimated.

In the pan auto shutter mode, the blur estimated value dV is calculated based on the shutter speed, the focal distance, and the motion vector of the main subject which becomes the pan target (based on the plural factors). Therefore, how much blurring of the main subject is generated by the automatic recording processing can properly be estimated.

In the smile detection auto shutter mode, the smile estimated value dS is calculated based on the degree of smile coincidence of the faces (degree of smile) and the ratio of the smiling persons (based on the plural factors). Therefore, the degree of smiling impression recorded by the automatic recording processing can properly be estimated.

Various Modifications of First Embodiment

The following modifications can be made in the first embodiment.

(i) In the first embodiment, the threshold S corresponding to the sensitivity level is set at the same value irrespective of the kind of auto shutter mode. Alternatively, the threshold S corresponding to the sensitivity level may be set at a different value in each auto shutter mode.

Although the sensitivity level is divided into four stages of Lv. 0 to Lv. 3, the sensitivity level may be divided into three stages, five stages, or six stages. That is, it is only necessary to set the sensitivity level at plural stages (levels).

(ii) In the first embodiment, in the anti blur auto shutter mode and the pan auto shutter mode, when the shutter is pressed halfway, the shutter speed is calculated once, and the blurring estimated value is sequentially calculated until the blurring estimated value becomes not lower than the threshold S based on the coefficient K1 corresponding to the calculated shutter speed, the coefficient K2 corresponding to the focal distance, and the motion vector dP calculated latest (steps S52 to S57, steps S61 to S70). Alternatively, the shutter speed is calculated each time the image data is photographed, and the blurring estimated value may be calculated until the blurring estimated value becomes riot lower than the threshold S based on the coefficient K2 corresponding to the focal distance, the coefficient K1 corresponding to the shutter speed calculated latest, and the motion vector dP calculated latest. This is because, in the one-time calculation of the shutter speed, sometimes automatic recording processing which does not satisfy the set sensitivity level is performed when the brightness of the subject is changed after the calculation.

(iii) In the first embodiment, in the anti blur auto shutter mode and the pan auto shutter mode, the determination of whether or not the set sensitivity level is satisfied is made based on the three factors, that is, the moving amount of the detected motion vector, the shutter speed, and the focal distance. Alternatively, the determination of whether or not the set sensitivity level is satisfied may be made based on at least one of the motion vector, the shutter speed, and the focal distance. Therefore, how much blurring of all the subjects or the main subject is generated by the automatic recording processing can be estimated.

In the smile detection auto shutter mode, the determination of whether or not the set sensitivity level is satisfied is made based on the factors, that is, the degree of smile coincidence of the faces (degree of smile) and the ratio of the smiling persons. Alternatively, the determination of whether or not the set sensitivity level is satisfied may be made based on at least one factor. Therefore, the degree of smiling impression recorded by the automatic recording processing can properly be estimated.

(iv) In the first embodiment, in the smile detection auto shutter mode, the determination of whether or not the set sensitivity level is satisfied is made based on two factors, that is, the degree of smile coincidence of the faces and the ratio of the smiling persons. Alternatively, a size of each face may be considered.

(v) In the first embodiment, the average value of the coefficients K3 corresponding to the degree of smile coincidence of the detected faces is calculated in step S84. Alternatively, the average value of the coefficients K3 corresponding to the faces having at least the degree of coincidence designated by the user or the predetermined degree of coincidence may be calculated.

(vi) In the first embodiment, the automatic recording processing is performed when the set sensitivity level is satisfied (steps S57 and S58, steps S70 and S71, and steps S88 and S89). Alternatively, when the set sensitivity level is satisfied, the frame image data photographed latest may be recorded as a still image.

(vii) In the first embodiment, in the case where one of the anti blur auto shutter mode and the pan auto shutter mode is set, the gain of the AGC circuit of the unit circuit 8 may be increased when the set sensitivity level is not satisfied for at least a predetermined time since the shutter button is pressed halfway or for at least a predetermined time since the comparison between the blur estimated value dV and the threshold S is started. In such cases, after the sensitivity is raised, the shutter speed is calculated again, and the coefficient K1 corresponding to the calculated shutter speed is obtained. The shutter speed is increased by raising the sensitivity, so that the sensitivity level can easily be satisfied.

(viii) In the first embodiment, in the case where the anti blur auto shutter mode is set, the anti blur auto shutter mode may automatically be changed to the pan auto shutter mode when the detected motion vectors are analyzed to determine that the pan photographing is performed. In such cases, the anti blur auto shutter mode is not immediately changed to the pan auto shutter mode, but may be changed to the pan auto shutter mode when the recording processing is not performed for a predetermined time (sensitivity level is not satisfied).

(ix) In the first embodiment, the automatic recording processing is performed when the sensitivity level is satisfied (steps S57 and S58, steps S70 and S71, and steps S88 and S89). Alternatively, tentative recording processing may be performed when the sensitivity level is satisfied, and the recording may be performed only when the user determines that the recording is performed. The preview display processing is performed on the image data obtained by the tentative recording processing, and the image data is recorded when the user performs the recording operation. Therefore, even if the recording is automatically performed against the user's intention, the user can determine whether or not the recording is performed, and advantageously an unnecessary image is not recorded.

The first embodiment and the modifications (i) to (ix) may arbitrarily be combined.

Second Embodiment

In the first embodiment, the recording can automatically be performed under the desired condition even if the user does not issue the recording instruction. However, because the recording processing is automatically performed when the condition is satisfied, the recording is performed while the user is not conscious of a shutter chance.

In a second embodiment, the user can recognize how much the currently photographed image satisfies the condition.

In the second embodiment, the same component as the first embodiment is designated by the same reference numeral, and the description thereof is omitted.

D. Improved Auto Shutter Mode Photographing Operation

An improved auto shutter mode photographing operation will be described with reference to FIGS. 14 to 17.

D-1. Improved Anti Blur Auto Shutter Mode Photographing Operation

Figure 14A:
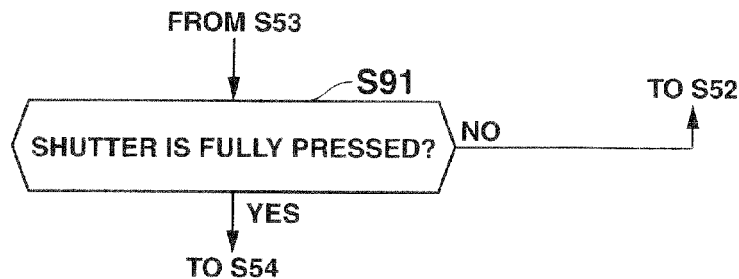
FIG. 14A is a flowchart showing an anti blur auto shutter photographing operation in a second embodiment of the invention.
Figure 14B:
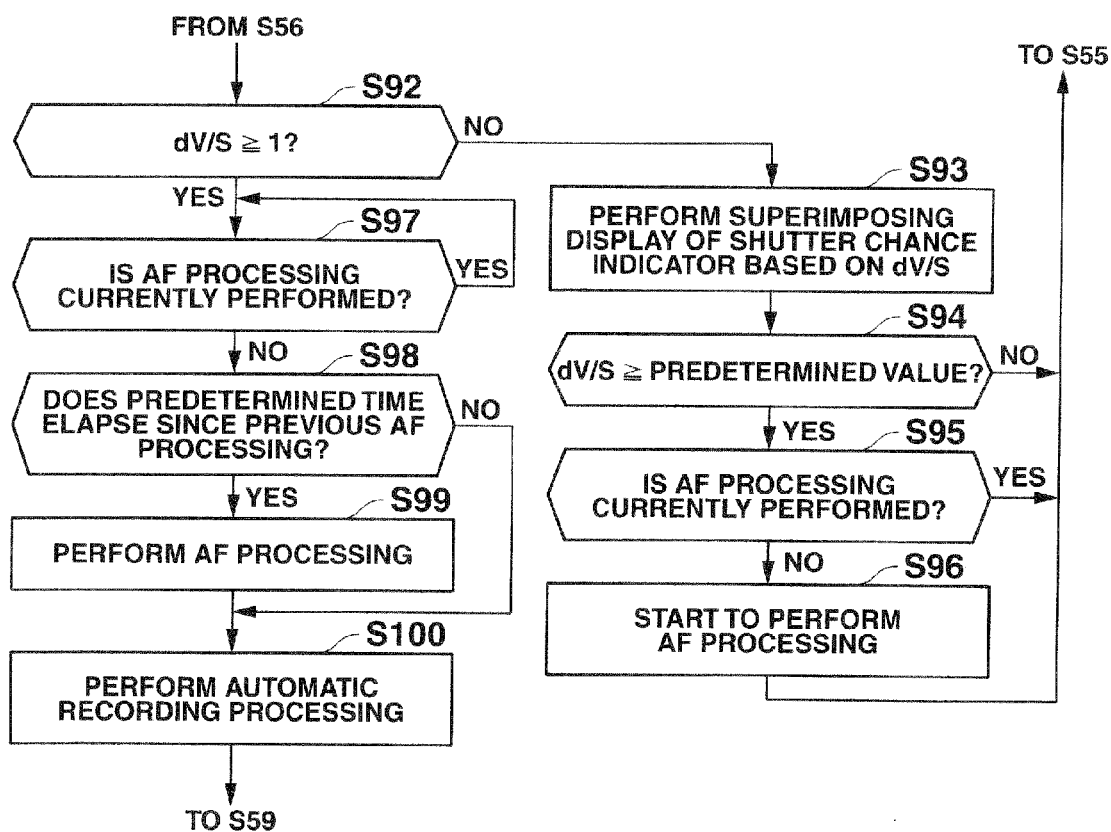
FIG. 14B is a flowchart showing an anti blur auto shutter photographing operation in the second embodiment.

The flowcharts of FIGS. 14A and 14B, which show the photographing operation in the improved anti blur auto shutter mode, are based on the flowchart of FIG. 10.

When performing the processing in step S53 of FIG. 10, the CPU 10 determines whether or not the user fully presses the shutter button. The determination in step S91 is made based on whether or not the operation signal corresponding to the full press operation of the shutter button is transmitted from the key input unit 11.

When the CPU 10 determines that the user does not fully press the shutter button in step S91, the flow returns to step S52. When the CPU 10 determines that the user fully presses the shutter button, the flow goes to step S54.

Figure 9:
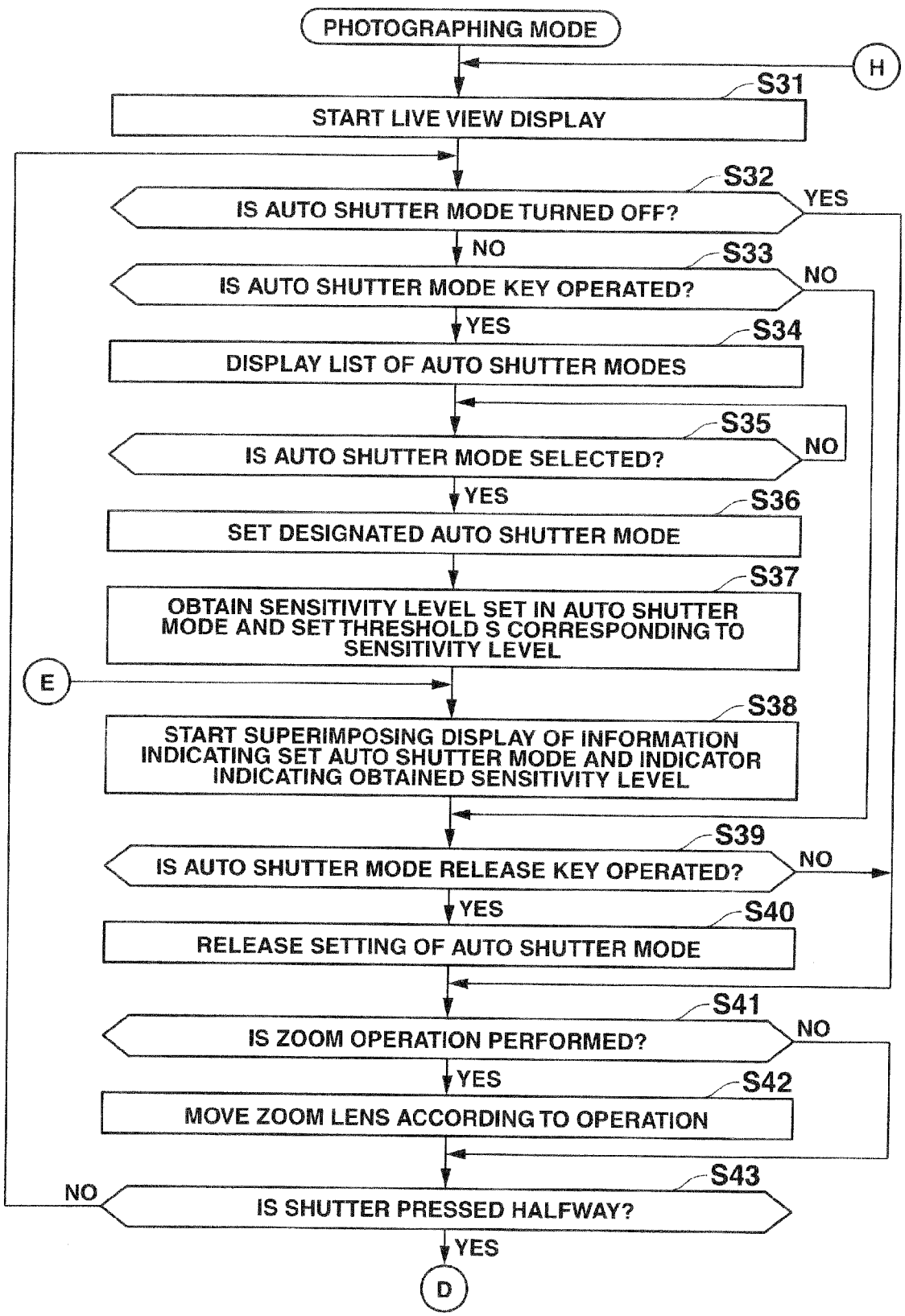
FIG. 9 is a flowchart showing a photographing operation.

When performing the processing in step S56 of FIG. 10, the CPU 10 compares the calculated blur estimated value dV and the threshold S obtained in step S37 of FIG. 9 (the set threshold in one of the thresholds S1 to S3), and determines whether or not blur estimated value dV/threshold S (degree of coincidence) is not lower than one (step S92). That is, the CPU 10 determines whether or not the set sensitivity level (auto shutter condition) is satisfied.

When determining that the blur estimated value dV/threshold S is lower than one in step S92, the CPU 10 superimposes the shutter indicator on the live view display based on the blur estimated value dV/threshold S, and indicates the degree of coincidence (step S93).

The shutter indicator indicates the degree of coincidence between the sequentially photographed image and the automatic recording condition.

Figure 15A:
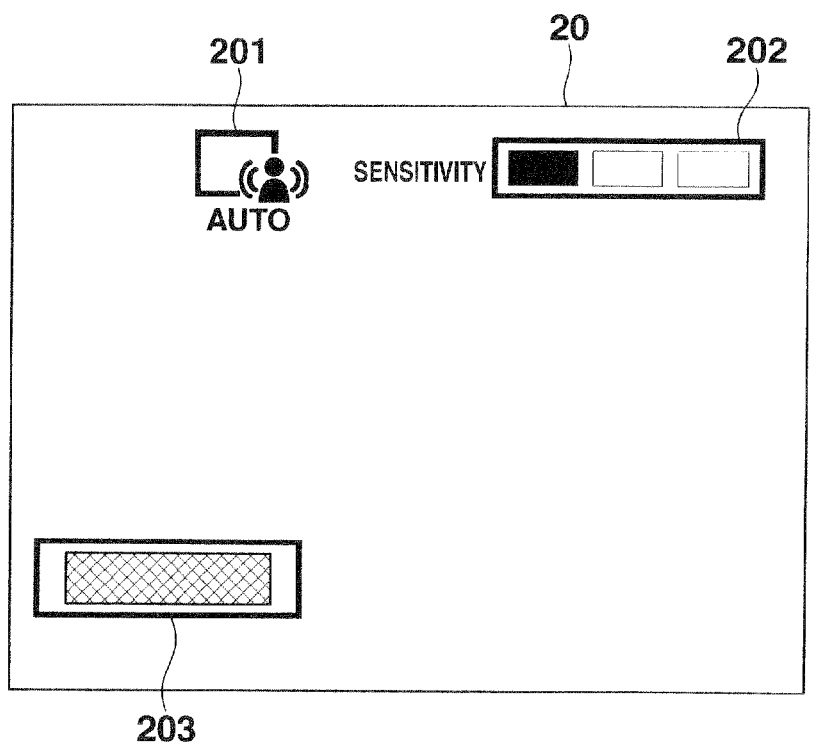
FIG. 15A shows examples of information indicating a set auto shutter mode and a shutter indicator which are superimposed in a live view in the second embodiment.

FIG. 15A shows a state in which a shutter indicator 203 is superimposed on the live view display. In the shutter indicator 203, a length of a horizontal side of a rectangle expressed by a hatched line becomes a barometer showing the degree of coincidence between the sequentially photographed image and the automatic recording condition.

Figure 15B:
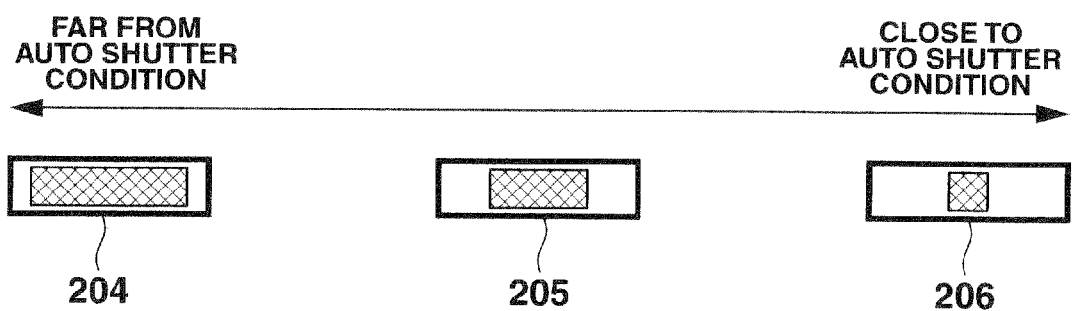
FIG. 15B shows a correlation between an automatic recording condition and changes in shutter indicators 204 to 206 in the second embodiment.

FIG. 15B shows the change of the barometer shown in the shutter indicator 203. When a shutter indicator 204 having the long horizontal side of the rectangle expressed by the hatched line is displayed, the sequentially photographed image and the automatic recording condition are distant from each other, and immediate recording is not performed. On the contrary, when a shutter indicator 206 having the short horizontal side of the rectangle expressed by the hatched line is displayed, the sequentially photographed image and the automatic recording condition are brought close to each other, and immediate recording is likely to be performed.

The proximity to the state in which the shutter is released is defined according to the value of (blur estimated value dV/threshold S) and the value of (smile estimated value dS/threshold S). That is, the state in which the shutter is released is brought closer as the value of (blur estimated value dV/threshold S) is increased. For example, in the case where (blur estimated value dV/threshold S) has a value of 0.9, because the value is considerably close to one, the length of the horizontal side of the rectangle expressed by the hatched line is considerably shortened. In the case where (blur estimated value dV/threshold S) has a value of 0.2, because the value is distant from one, the length of the horizontal side of the rectangle expressed by the hatched line is considerably lengthened.

When determining that the blur estimated value dV/threshold S is not lower than a predetermined value in step S94, the CPU 10 determines that the currently photographed image is very close to the automatic recording condition, and determines whether or not the AF processing is currently performed (step S95).

When the CPU 10 determines that the AF processing is not currently performed in step S95, the AF processing is started (step S96), and the flow returns to step S55. When the CPU 10 determines that the AF processing is currently performed in step S95, the flow directly returns to step S55. The AF processing may be performed on a predetermined region, or the AF processing may be performed on a region which is arbitrarily designated by the user.

Thus, when the blur estimated value dV/threshold S is not lower than the predetermined value, the CPU 10 determines that the automatic recording is performed soon, and the AF processing is previously performed. Therefore, even if the recording processing is immediately performed, a focused image can be obtained.

When the AF processing is performed to take the photograph after the CPU 10 determines that the auto shutter condition is satisfied, unfortunately a time lag is generated to record the image data in which the auto shutter condition is not satisfied (image blurring is generated). Therefore, the problem can be prevented in the second embodiment.

When determining that the blur estimated value dV/threshold S is not lower than one in step S92, the CPU 10 determines whether or not the AF processing is currently performed (step S97).

When the CPU 10 determines that the AF processing is currently performed in step S97, the CPU 10 maintains the processing in step S97 until the AF processing is ended. When the CPU 10 determines that the AF processing is not currently performed, the CPU 10 determines whether or not a predetermined time (for example, 15 seconds) elapses since the previous AF processing is ended (step S98).

When determining that the predetermined time elapses since the previous AF processing is ended in step S98, the CPU 10 performs the AF processing (step S99), and the flow goes to step S100. When the CPU 10 determines that the predetermined time does not elapse since the previous AF processing is ended in step S98, the flow directly goes to step S100. When the AF processing has not been performed, the CPU 10 determines that the predetermined time elapses since the previous AF processing is ended.

Thus, when the predetermined time elapses since the previous AF processing is ended, although a time lag is generated to a certain extent, the AF processing is performed in order to give a priority to the focused image.

In step S100, the CPU 10 performs the recording with the auto shutter, that is, the automatic recording processing. Then the flow goes to step S59.

D-2. Improved Pan Auto Shutter Mode Photographing Operation

Figure 16A:
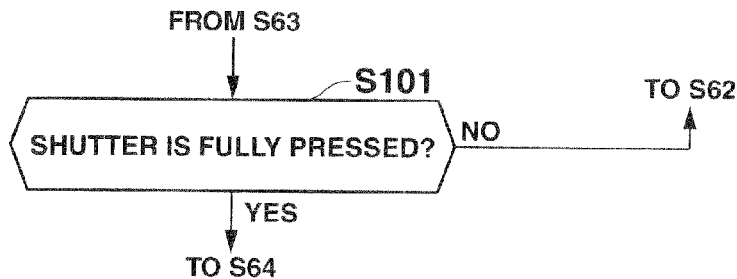
FIG. 16A is a flowchart showing a pan auto shutter photographing operation in the second embodiment.
Figure 16B:
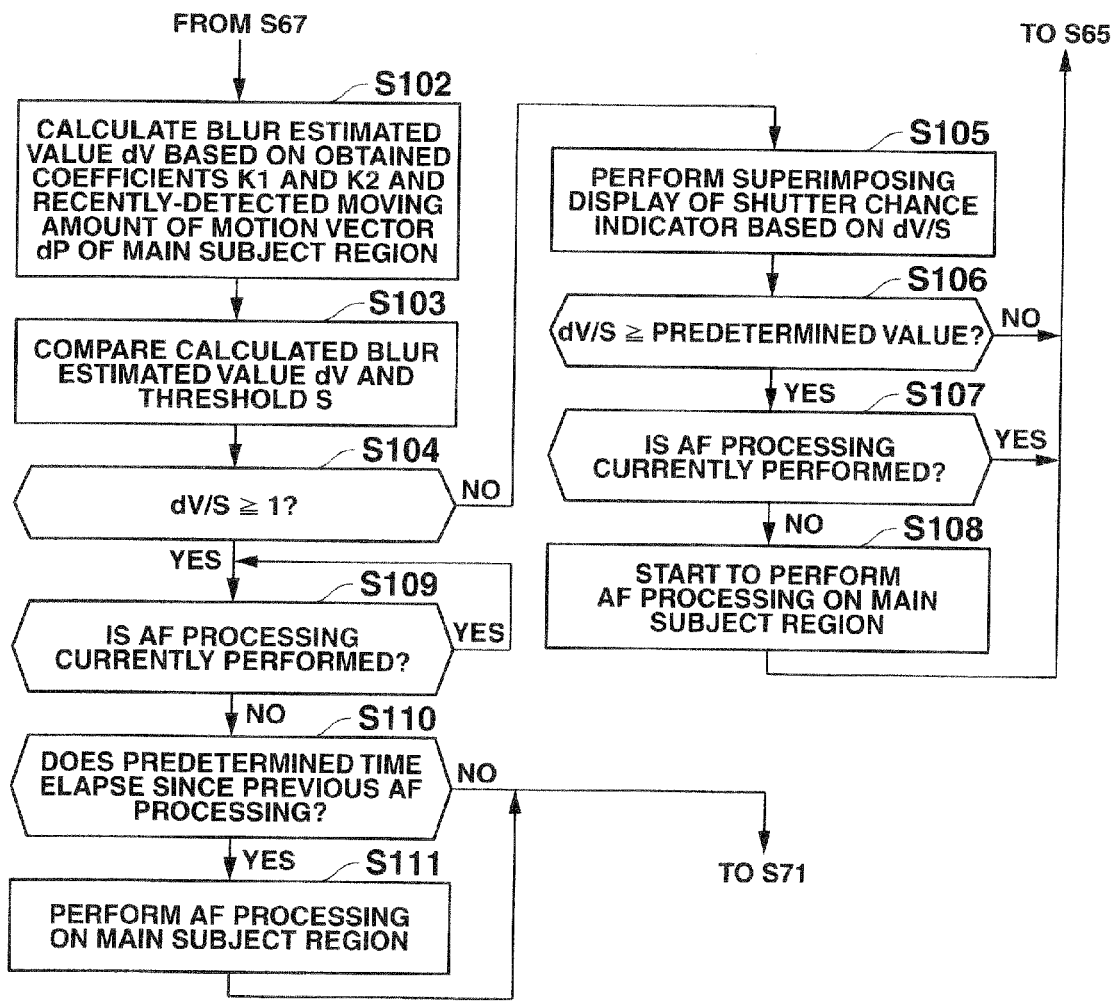
FIG. 16B is a flowchart showing the pan auto shutter photographing operation in the second embodiment.

The flowcharts of FIGS. 16A and 16B, which show the photographing operation in the improved pan auto shutter mode, are based on the flowchart of FIG. 11.

When performing the processing in step S63 of FIG. 11, the CPU 10 determines whether or not the user fully presses the shutter button (step S101). The determination in step S101 is made based on whether or not the operation signal corresponding to the full press operation of the shutter button is transmitted from the key input unit 11.

When the CPU 10 determines that the user does not fully press the shutter button in step S101, the flow returns to step S62. When the CPU 10 determines that the user fully presses the shutter button, the flow goes to step S64.

When performing the processing in step S67 of FIG. 11, the CPU 10 calculates the blur estimated value dV based on the obtained coefficient K1 and coefficient K2 and the detected moving amount dP of the motion vector of each pixel region of the main subject region (step S102). The blur estimated value dV is obtained from Eq. 1.

The CPU 10 compares the calculated blur estimated value dV and the threshold S obtained in step S37 of FIG. 9 (step S103), and determines whether or not blur estimated value dV/threshold S (degree of coincidence) is not lower than one (step S104). That is, the CPU 10 determines whether or not the set sensitivity level is satisfied.

When determining that the blur estimated value dV/threshold S is lower than one in step S104, the CPU 10 superimposes the shutter indicator 203 (204 to 206) on the live view display based on the blur estimated value dV/threshold S, and indicates the degree of coincidence (step S105).

Because the display mode in step S105 is similar to that of the improved anti blur auto shutter photographing operation D-1, the description thereof is omitted.

When determining that the blur estimated value dV/threshold S is not lower than a predetermined value in step S106, the CPU 10 determines that the currently photographed image is very close to the automatic recording condition, and determines whether or not the AF processing is currently performed (step S107).

When the CPU 10 determines that the AF processing is not currently performed in step S107, the AF processing is started (step S108), and the flow returns to step S65. When the CPU 10 determines that the AF processing is currently performed in step S107, the flow directly returns to step S65. The AF processing may be performed on a predetermined region, or may be performed on a region which is arbitrarily designated by the user.

When determining that the blur estimated value dV/threshold S is not lower than one in step S104, the CPU 10 determines whether or not the AF processing is currently performed (step S109).

When determining that the AF processing is currently performed in step S109, the CPU 10 maintains the processing in step S109 until the AF processing is ended. When determining that the AF processing is not currently performed in step S109, the CPU 10 determines whether or not a predetermined time (for example, 15 seconds) elapses since the previous AF processing is ended (step S110).

When determining that the predetermined time elapses since the previous AF processing is ended in step S110, the CPU 10 performs the AF processing (step S111), and the flow goes to step S71. When the CPU 10 determines that the predetermined time does not elapse since the previous AF processing is ended, the flow directly goes to step S71. When the AF processing has not been performed, the CPU 10 determines that the predetermined time elapses since the previous AF processing is ended.

Thus, when the predetermined time elapses since the previous AF processing is ended, although a time lag is generated to a certain extent, the AF processing is performed in order to give a priority to the focused image.

D-3. Improved Smile Detection Auto Shutter Mode Photographing Operation

Figure 17A:
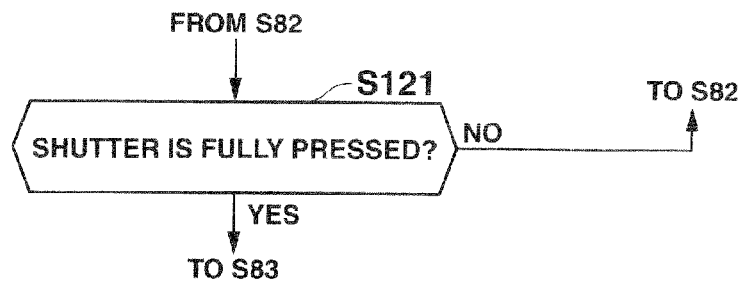
FIG. 17A is a flowchart showing a smile detection auto shutter photographing operation in the second embodiment.
Figure 17B:
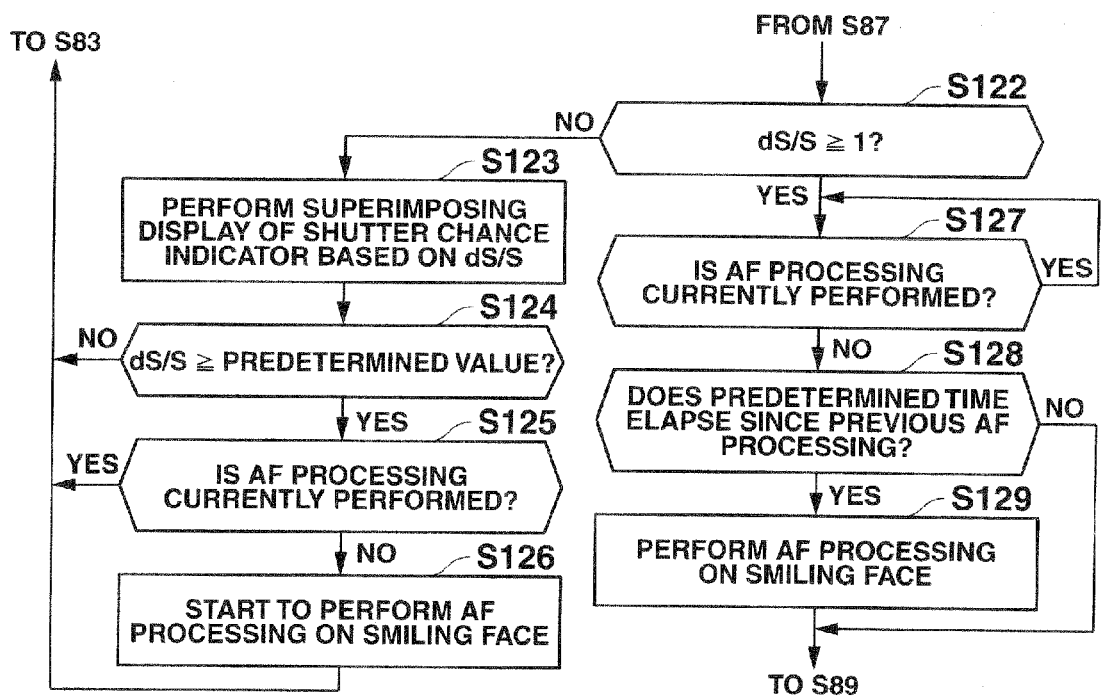
FIG. 17B is a flowchart showing a smile detection auto shutter photographing operation in the second embodiment.

The flowcharts of FIGS. 17A and 17B, which show the photographing operation in the improved smile detection auto shutter mode, are based on the flowchart of FIG. 12.

When performing the processing in step S82 of FIG. 12, the CPU 10 determines whether or riot the user fully presses the shutter button (step S121). The determination in step S121 is made based on whether or not the operation signal corresponding to the full press operation of the shutter button is transmitted from the key input unit 11.

When the CPU 10 determines that the user does not fully press the shutter button in step S121, the flow returns to step S82. When the CPU 10 determines that the user fully presses the shutter button, the flow goes to step S83.

When performing the processing in step S87 of FIG. 12, the CPU 10 determines whether or not smile estimated value dS/threshold S is not lower than one (step S122). That is, the CPU 10 determines whether or not the set sensitivity level is satisfied.

When determining that the blur estimated value dV/threshold S is lower than one in step S122, the CPU 10 superimposes the shutter indicator 203 (204 to 206) on the live view display based on the smile estimated value dS/threshold S, and indicates the degree of coincidence (step S123).

Because the display mode in step S123 is similar to that of the improved anti blur auto shutter photographing operation D-1 and the improved pan auto shutter photographing operation D-2, the description thereof is omitted.

When determining that the smile estimated value dS/threshold S is not lower than a predetermined value in step S124, the CPU 10 determines that the currently photographed image is very close to the automatic recording condition, and determines whether or not the AF processing is currently performed (step S125).

When the CPU 10 determines that the AF processing is not currently performed in step S125, the AF processing is started on smiling face (step S126), and the flow returns to step S83. When the CPU 10 determines that the AF processing is currently performed in step S125, the flow directly returns to step S83. The AF processing may be performed on a predetermined region, or may be performed on a region which is arbitrarily designated by the user.

When determining that the smile estimated value dS/threshold S is not lower than one in step S122, the CPU 10 determines whether or not the AF processing is currently performed (step S127).

When determining that the AF processing is currently performed in step S127, the CPU 10 maintains the processing in step S127 until the AF processing is ended. When determining that the AF processing is not currently performed in step S127, the CPU 10 determines whether or not a predetermined time (for example, 15 seconds) elapses since the previous AF processing is ended (step S128).

When determining that the predetermined time elapses since the previous AF processing is ended in step S128, the CPU 10 performs the AF processing on smiling face (step S129), and the flow goes to step S89. When the CPU 10 determines that the predetermined time does not elapse since the previous AF processing is ended, the flow directly goes to step S89. When the AF processing has not been performed, the CPU 10 determines that the predetermined time elapses since the previous AF processing is ended.

Thus, when the predetermined time elapses since the previous AF processing is ended, although a time lag is generated to a certain extent, the AF processing is performed in order to give a priority to the focused image.

In the second embodiment, the determination of whether or not the auto shutter condition is satisfied is made after the shutter is fully pressed. Therefore, after the shutter is fully pressed, the recording processing can be performed while the user is moved away from the camera to enter the photographing angle of view.

Because the shutter indicator 203 (204 to 206) is superimposed on the live view display, the user can recognize to what extent the automatic recording condition is satisfied, and the user can know the recording timing in advance.

The recording processing is rapidly performed when the automatic recording condition is satisfied, so that a focused image can be obtained.

In the case where the AF processing is currently performed even if the automatic recording condition is satisfied, the recording processing is not performed until the AF processing is ended, so that a focused image can be obtained.

In the case where the predetermined time elapses since the previous AF processing is ended, the AF processing is performed, so that a focused image can be obtained.

The embodiments and modifications of the invention have been described above only by way of example. The embodiments and modifications have been described such that the principle and the structure of the invention can better be understood, and the scope of the appended claims is not limited to the embodiments and modifications.

Accordingly, it should be understood that various modifications and changes of the embodiments of the invention are included in the scope of the invention and protected by the scope of the appended claims.

In the embodiments, the image recording apparatus is applied to the digital camera. However, the invention is not limited to the embodiments, and the invention can be applied to a device which can photograph a subject and a device provided with a storage medium in which a program executed by the CPU is stored.

What is claimed is:

1. An imaging device comprising:
   an imaging unit configured to periodically capture an image;
   an image recording unit configured to record the image captured by the imaging unit;
   a mode display unit configured to display a plurality of selectable image capture modes and to display a respective explanation of a designated one of the image capture modes, wherein each of the image capture modes has a corresponding level of sensitivity of the image recording unit;
   a selection unit configured to select one of the image capture modes;
   a setting unit configured to set the level of sensitivity of the image recording unit corresponding to the selected image capture mode;
   a determination unit configured to determine whether or not the image captured by the imaging unit satisfies the level of sensitivity set by the setting unit;
   a time determination unit configured to, when the determination unit determines that the image satisfies the level of sensitivity, determine whether or not a predetermined time has elapsed since a previous autofocus processing;
   a recording control unit configured to, when the time determination unit determines that the predetermined time has elapsed, control the image recording unit to record an image captured by the imaging unit after performing the autofocus processing again; and
   a display unit configured to display: (i) the image captured by the imaging unit, (ii) the level of sensitivity set by the setting unit, and (iii) a degree of coincidence between the captured image and the level of sensitivity set by the setting unit.

2. The imaging device according to claim 1, wherein the mode display unit is configured to display the levels of sensitivity corresponding to the image capture modes.

3. The imaging device according to claim 1, further comprising a shutter speed calculation unit configured to calculate a shutter speed based on the image captured by the imaging unit,
   wherein in one of the image capture modes, the level of sensitivity set by the setting unit comprises a threshold value based shutter speed at which image blurring does not occur in recording, and the determination unit is configured to determine whether or not the image satisfies the level of sensitivity by comparing the shutter speed calculated by the shutter speed calculation unit and the threshold value based shutter speed.

4. The imaging device according to claim 1, further comprising a focal distance obtaining unit configured to obtain a focal distance based on the image captured by the imaging unit,
   wherein in one of the image capture modes, the level of sensitivity set by the setting unit comprises a threshold value based focal distance at which image blurring does not occur in recording, and the determination unit is configured to determine whether or not the image satisfies the level of sensitivity by comparing the focal distance obtained by the focal distance obtaining unit and the threshold value based focal distance.

5. The imaging device according to claim 1, further comprising a moving amount detection unit configured to detect a moving amount of the image captured by the imaging unit,
   wherein in one of the image capture modes, the level of sensitivity set by the setting unit comprises a threshold value based moving amount at which image blurring does not occur in recording, and the determination unit is configured to determine whether or not the image satisfies the level of sensitivity by comparing the moving amount detected by the moving amount detection unit and the threshold value based moving amount.

6. The imaging device according to claim 5, wherein the moving amount detection unit is configured to detect the moving amount for each pixel region in the image captured by the imaging unit,
   wherein the imaging device further comprises:
      a moving direction detection unit configured to detect a moving direction of each pixel region in the image captured by the imaging unit; and
      a specifying unit configured to specify a main subject region based on the moving amount for each pixel region detected by the moving amount detection unit and the moving direction of each pixel region detected by the moving direction detection unit, and
   wherein in said one of the image capture modes, the level of sensitivity set by the setting unit comprises a moving amount at which image blurring of the main subject region in the image does not occur in recording.

7. The imaging device according to claim 1, further comprising a facial image detection unit configured detect a facial image from the image captured by the imaging unit, and
wherein in one of the image capture modes, the level of sensitivity set by the setting unit comprises a threshold value based smiling state, and the determination unit is configured to determine whether or not the image satisfies the level of sensitivity by comparing a smiling state of the facial image detected by the facial image detection unit and the threshold value based smiling state.

8. The imaging device according to claim 1, further comprising a facial image number detection unit configured to detect a number of facial images from the image captured by the imaging unit,
wherein in one of the image capture modes, the level of sensitivity set by the setting unit comprises a threshold value based ratio of a number of smiling facial images to a total number of facial images in the image, and the determination unit is configured to determine whether or not the image satisfies the level of sensitivity by comparing a ratio of the number of smiling facial images in the image to the number of facial images detected by the facial image number detection unit and the threshold value based ratio.

9. A non-transitory computer readable storage medium having a computer program stored thereon that is executed by a computer of an image capture apparatus to control the image capture apparatus to perform functions comprising:
displaying a plurality of selectable image capture modes, and displaying a respective explanation of a designated one of the image capture modes, wherein each of the image capture modes has a corresponding level of sensitivity;
selecting one of the image capture modes;
setting the level of sensitivity corresponding to the selected image capture modes;
determining whether or not a captured image satisfies the set level of sensitivity;
determining, when it is determined that the captured image satisfies the set level of sensitivity, whether or not a predetermined time has elapsed since a previous autofocus processing;
recording, when it is determined that the predetermined time has elapsed since the previous autofocus processing, an image captured after performing the autofocus processing again; and
displaying: (i) the captured image, (ii) the set level of sensitivity, and (iii) a degree of coincidence between the captured image and the set level of sensitivity.

10. The imaging device according to claim 1, further comprising a sensitivity level changing unit which is operable to change the level of sensitivity corresponding to the designated one of the image capture modes.

11. The imaging device according to claim 1, further comprising an input unit which is operable to change the designated one of the image capture modes to designate a different one of the image capture modes.

12. The imaging device according to claim 1, wherein the image capture modes comprise plurality of automatic image capture modes, and the respective explanation of each of the automatic image capture modes explains a condition according to which automatic image capturing will be performed.

13. The imaging device according to claim 12, wherein the mode display unit displays an additional selectable image capture mode in which automatic image capturing is turned off, and which does not have a level of sensitivity corresponding thereto.

14. The non-transitory computer readable storage medium according to claim 9, wherein the functions further comprise changing the level of sensitivity corresponding to the designated one of the image capture modes.

15. The non-transitory computer readable storage medium according to claim 9, wherein the functions further comprise changing the designated one of the image capture modes to designate a different one of the image capture modes in response to a user input.

16. The non-transitory computer readable storage medium according to claim 9, wherein the image capture modes include a plurality of automatic image capture modes, and the respective explanation of each of the automatic image capture modes explains a condition according to which automatic image capturing will be performed.

17. The non-transitory computer readable storage medium according to claim 9, wherein the functions further comprise displaying an additional selectable image capture mode in which automatic image capturing is turned off, and which does not have a level of sensitivity corresponding thereto.

* * * * *